US010676571B2

(12) United States Patent
Zhou et al.

(10) Patent No.: US 10,676,571 B2
(45) Date of Patent: *Jun. 9, 2020

(54) POLYETHERIMIDES WITH IMPROVED MELT STABILITY

(71) Applicant: SABIC GLOBAL TECHNOLOGIES B.V., Bergen op Zoom (NL)

(72) Inventors: Hao Zhou, Newburgh, IN (US); Manojkumar Chellamuthu, Mount Vernon, IN (US); Aaron Royer, Evansville, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 776 days.

This patent is subject to a terminal disclaimer.

(21) Appl. No.: 14/094,104

(22) Filed: Dec. 2, 2013

(65) Prior Publication Data

US 2015/0152224 A1 Jun. 4, 2015

(51) Int. Cl.
| | | |
|---|---|---|
| C08G 73/10 | (2006.01) | |
| B29C 45/00 | (2006.01) | |
| B29C 49/00 | (2006.01) | |
| C08L 79/08 | (2006.01) | |
| B29K 79/00 | (2006.01) | |

(52) U.S. Cl.
CPC .......... *C08G 73/1071* (2013.01); *B29C 45/00* (2013.01); *B29C 49/00* (2013.01); *C08G 73/10* (2013.01); *C08G 73/1021* (2013.01); *C08L 79/08* (2013.01); *B29K 2079/085* (2013.01); *Y10T 428/31681* (2015.04); *Y10T 428/31721* (2015.04)

(58) Field of Classification Search
CPC ... B29C 45/00; B29C 49/00; B29K 2079/085; C08G 73/10; C08G 73/1071; C08G 73/1021; C08L 79/08; Y10T 428/31681; Y10T 428/31721
See application file for complete search history.

(56) References Cited

U.S. PATENT DOCUMENTS

| | | |
|---|---|---|
| 3,671,487 A | 6/1972 | Abolins |
| 3,948,941 A | 4/1976 | Patton |
| 3,998,840 A | 12/1976 | Williams, III et al. |
| 4,065,433 A | 12/1977 | Muller et al. |
| 4,073,773 A | 2/1978 | Banucci et al. |
| 4,100,140 A | 7/1978 | Zahir et al. |
| 4,193,454 A | 3/1980 | Goldstein |
| 4,273,712 A | 6/1981 | Williams, III |
| 4,324,882 A | 4/1982 | Takekoshi |
| 4,324,883 A | 4/1982 | White et al. |
| 4,324,884 A | 4/1982 | White et al. |
| 4,324,885 A | 4/1982 | White et al. |
| 4,460,778 A | 7/1984 | Brunelle |
| 4,554,357 A | 11/1985 | Verbicky, Jr. et al. |
| 4,577,033 A | 3/1986 | Verbicky, Jr. et al. |
| 4,595,760 A | 6/1986 | Brunelle |
| 4,666,735 A | 5/1987 | Hoover et al. |
| 4,681,949 A | 7/1987 | Brunelle |
| 4,785,069 A | 11/1988 | Kouno et al. |
| 4,870,155 A | 9/1989 | Matzner et al. |
| 5,068,357 A | 11/1991 | Tsumura et al. |
| 5,084,551 A | 1/1992 | Schaffer et al. |
| 5,156,732 A | 10/1992 | Ogasawara et al. |
| 5,189,128 A | 2/1993 | Maw et al. |
| 5,212,008 A | 5/1993 | Malhotra et al. |
| 5,229,482 A | 7/1993 | Brunelle |
| 5,310,580 A | 5/1994 | O'Sullivan et al. |
| 5,362,837 A | 11/1994 | Takekoshi et al. |
| 5,438,114 A | 8/1995 | White et al. |
| 5,514,813 A | 5/1996 | Brunelle |
| 5,521,230 A | 5/1996 | Bhatia et al. |
| 5,539,048 A | 7/1996 | Gagne et al. |
| 5,637,387 A | 6/1997 | Chin et al. |
| 5,663,275 A | 9/1997 | Schmidhauser |
| 5,688,902 A | 11/1997 | Bernard et al. |
| 5,830,974 A | 11/1998 | Schmidhauser et al. |
| 5,839,074 A | 11/1998 | Plehn |
| 5,856,421 A | 1/1999 | Schmidhauser |
| 5,907,025 A | 5/1999 | Brunelle |
| 5,908,915 A | 6/1999 | Brunelle |
| 5,969,086 A | 10/1999 | Webb et al. |
| 5,999,787 A | 12/1999 | Finsterwalder et al. |
| 6,066,743 A | 5/2000 | Nick et al. |
| 6,087,513 A | 7/2000 | Liao et al. |
| 6,096,900 A | 8/2000 | Nick et al. |
| 6,235,866 B1 | 5/2001 | Khouri et al. |
| 6,251,354 B1 | 6/2001 | Greenwell et al. |

(Continued)

FOREIGN PATENT DOCUMENTS

| | | |
|---|---|---|
| EP | 0054426 A2 | 6/1982 |
| EP | 0235388 A2 | 9/1987 |

(Continued)

OTHER PUBLICATIONS

International Search Report for International Application No. PCT/US2013/063444, International Application Filing Date Oct. 4, 2013, dated Apr. 16, 2014, 5 pages.
Written Opinion for International Application No. PCT/US2013/063444, International Application Filing Date Apr. 10, 2013, dated Apr. 16, 2014, 7 pages.
International Preliminary Report on Patentability for International Application Filing No. PCT/US2013/063444, International Application Filing Date Oct. 4, 2013, dated Apr. 7, 2015, 8 pages.
International Preliminary Report on Patentability for International Application No. PCT/US2013/063240, International Application Filing Date Oct. 3, 2013, dated Apr. 7, 2015, 4 pages.

(Continued)

*Primary Examiner* — John D Freeman
(74) *Attorney, Agent, or Firm* — Cantor Colburn LLP

(57) ABSTRACT

A polyetherimide composition comprises the polymerization product of a catalyzed imidization product of a 3-substituted phthalic anhydride and a sulfone diamine having improved melt stability and reduced corrosivity, and a method of manufacture thereof.

32 Claims, 17 Drawing Sheets

(56) References Cited

U.S. PATENT DOCUMENTS

| | | |
|---|---|---|
| 6,265,521 B1 | 7/2001 | Fyvie et al. |
| 6,365,710 B1 | 4/2002 | Wang et al. |
| 6,570,038 B1 | 5/2003 | Caringi et al. |
| 6,620,320 B1 | 9/2003 | Hying et al. |
| 6,630,568 B1 | 10/2003 | Johnson et al. |
| 6,790,263 B1 | 9/2004 | Ding et al. |
| 6,790,934 B2 | 9/2004 | Johnson et al. |
| 6,849,706 B1 | 2/2005 | Brunelle et al. |
| 6,906,168 B2 | 6/2005 | Khouri et al. |
| 6,919,418 B2 | 7/2005 | Khouri et al. |
| 6,949,622 B2 | 9/2005 | Silvi et al. |
| 7,071,282 B2 | 7/2006 | Acar et al. |
| 7,115,785 B2 | 10/2006 | Guggenheim et al. |
| 7,122,619 B2 | 10/2006 | Silvi et al. |
| 7,125,954 B2 | 10/2006 | Guggenheim et al. |
| 7,226,989 B2 | 6/2007 | Silvi et al. |
| 7,481,959 B2 | 1/2009 | Richards et al. |
| 7,485,723 B2 | 2/2009 | Gupta et al. |
| 7,495,113 B2 | 2/2009 | Pressman et al. |
| 7,605,222 B2 | 10/2009 | Ye et al. |
| 7,714,095 B2 | 5/2010 | Brunelle et al. |
| 7,772,435 B2 | 8/2010 | Guggenheim et al. |
| 7,842,188 B2 | 11/2010 | Hall et al. |
| 7,902,407 B2 | 3/2011 | Silva et al. |
| 7,981,996 B2 | 7/2011 | Khouri et al. |
| 8,274,744 B2 | 9/2012 | Haralur et al. |
| 8,372,941 B2 | 2/2013 | Bernabe et al. |
| 2003/0067089 A1 | 4/2003 | Wang et al. |
| 2003/0121844 A1 | 7/2003 | Koo et al. |
| 2003/0220455 A1 | 11/2003 | Ichiroku et al. |
| 2004/0034131 A1 | 2/2004 | Chowdhury et al. |
| 2004/0099603 A1 | 5/2004 | Livingston |
| 2004/0110854 A1 | 6/2004 | Lyu et al. |
| 2005/0218381 A1 | 10/2005 | Maruyama et al. |
| 2005/0222334 A1 | 10/2005 | Srinivasan et al. |
| 2006/0004180 A1 | 1/2006 | Itatani |
| 2006/0004224 A1 | 1/2006 | Colborn et al. |
| 2006/0046446 A1 | 3/2006 | Kon et al. |
| 2006/0135741 A1 | 6/2006 | Gui et al. |
| 2006/0251945 A1 | 11/2006 | Song et al. |
| 2007/0073035 A1 | 3/2007 | Stella et al. |
| 2007/0093667 A1 | 4/2007 | Watanabe et al. |
| 2007/0116907 A1 | 5/2007 | Landon et al. |
| 2007/0117926 A1 | 5/2007 | Landon et al. |
| 2007/0141456 A1 | 6/2007 | Wang et al. |
| 2007/0160781 A1 | 7/2007 | Landon et al. |
| 2007/0173596 A1 | 7/2007 | Landon et al. |
| 2007/0173597 A1 | 7/2007 | Williams et al. |
| 2007/0173598 A1 | 7/2007 | Williams et al. |
| 2007/0178256 A1 | 8/2007 | Landon |
| 2007/0178257 A1 | 8/2007 | Landon |
| 2007/0179242 A1 | 8/2007 | Landon |
| 2008/0269396 A1 | 10/2008 | Karaman et al. |
| 2009/0163691 A1 | 6/2009 | Bernabe et al. |
| 2009/0264572 A1 | 10/2009 | Liao et al. |
| 2009/0288764 A1 | 11/2009 | Arrington |
| 2010/0080983 A1 | 4/2010 | Anderson |
| 2011/0263791 A1 | 10/2011 | Chiong et al. |
| 2013/0053489 A1 | 2/2013 | Gallucci et al. |
| 2013/0108851 A1 | 5/2013 | Kuhlman et al. |
| 2013/0260125 A1 | 10/2013 | Ordonez et al. |
| 2014/0094535 A1 | 4/2014 | Guggenheim et al. |
| 2014/0094536 A1 | 4/2014 | Guggenheim et al. |
| 2014/0099510 A1 | 4/2014 | Chiong et al. |

FOREIGN PATENT DOCUMENTS

| | | |
|---|---|---|
| EP | 0411461 A2 | 2/1991 |
| EP | 0491190 A2 | 6/1992 |
| EP | 0634437 A1 | 1/1995 |
| EP | 2644640 A1 | 10/2013 |
| EP | 2644641 A1 | 10/2013 |
| GB | 1217363 | 12/1970 |
| GB | 1454960 | 11/1976 |
| GB | 1487633 | 10/1977 |
| GB | 1547343 | 6/1979 |
| GB | 2390042 A | 12/2003 |
| JP | 62126172 | 6/1987 |
| JP | 2010195888 A | 9/2010 |
| WO | 8806605 | 9/1988 |
| WO | 9304099 | 3/1993 |
| WO | 9402540 | 2/1994 |
| WO | 9745498 | 12/1997 |
| WO | 9805749 | 2/1998 |
| WO | 9962894 | 12/1999 |
| WO | 0125196 A2 | 4/2001 |
| WO | 2004035689 A1 | 4/2004 |
| WO | 2004067623 A2 | 8/2004 |
| WO | 2006071682 A3 | 7/2006 |
| WO | 2009086006 A2 | 7/2009 |
| WO | 2011082147 A1 | 7/2011 |
| WO | 2013063470 A1 | 5/2013 |
| WO | 2014055747 | 4/2014 |

OTHER PUBLICATIONS

International Preliminary Report on Patentability, dated Apr. 16, 2015.
International Search Report and Written Opinion, International Application No. PCT/US2014/068040, dated Mar. 4, 2015.
JP03193106 B2 English Abstract; Date of Publication Jul. 30, 2001; 2 pages.
JP10139753 A, Abstract Only, 1 page.
JP2010195888 A, Sep. 9, 2010, Abstract Only, 1 page.
JP62126172 A, Jun. 8, 1987, Abstract Only, 1 page.
JP63273620 A, Nov. 10, 1988, Abstract Only, 1 page.
International Search Report for International Application No. PCT/US2013/063240, International Application Filing Date Oct. 3, 2013, dated Dec. 18, 2013, 4 pages.
Written Opinion for International Application No. PCT/US2013/063240, International Application Filing Date Oct. 3, 2013, dated Dec. 18, 2013, 3 pages.
Satomi et al. ðThe effect of the Phase-Transfer Catalysts by Hexaalkyl-guanidinium salt; Nippon Kagakkai Koen Yokoshu; 2005 6 pages; English translation with Certification.
Sun et al., "Synthesis and properties of polyimides containing 2,2'-bipyridine derivatives", Macromolecular Chemistry and Physics, vol. 198, Issue 3, pp. 833-841, 1997.
Non-Final Office Action, dated Dec. 23, 2014.

POLYETHERIMIDES WITH IMPROVED MELT STABILITY

BACKGROUND OF THE INVENTION

This disclosure relates to polyetherimides and compositions containing the polyetherimides, as well as their method of manufacture and articles formed from the polyetherimide compositions.

Polyetherimides ("PEIs") are amorphous, transparent, high performance polymers having a glass transition temperature ("Tg") of greater than 180° C. PEIs further have high strength, heat resistance, modulus, and broad chemical resistance, and so are widely used in applications as diverse as automotive, telecommunication, aerospace, electrical/electronics, transportation, and healthcare.

One process for the manufacture of polyetherimides is by polymerization of alkali metal salts of dihydroxyaromatic compounds, such as bisphenol A disodium salt (BPA.Na$_2$), with a bis(halophthalimide).

However, molding at high temperatures can degrade the properties and/or performance of the polyetherimides in some applications. Thus, there remains a need in the art for methods to produce such polyetherimides having improved performance during extended processing times at high temperatures.

SUMMARY OF THE INVENTION

Disclosed herein is a method for the manufacture of a polyetherimide composition having improved melt stability, the method comprising: catalyzing imidization of an anhydride composition comprising 3-substituted phthalic anhydride of the formula

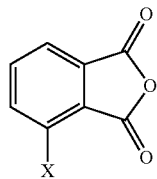

with a sulfone diamine selected from 3,3'-diaminodiphenyl sulfone, 3,4'-diaminodiphenyl sulfone, 4,4'-diamino diphenyl sulfone, and combinations thereof with a guanidinium salt catalyst in the presence of a solvent, to provide a bis(phthalimide) composition comprising a residue of the catalyst and a 3,3'-bis(phthalimide) of the formula

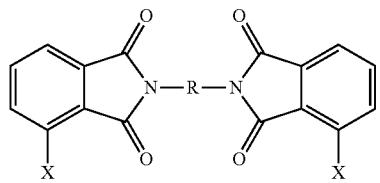

wherein the 3-substituted phthalic anhydride and the sulfone diamine convert to the bis(phthalimide) to at least 99% completion, and catalyzing polymerization of the 3,3'-bis(phthalimide) and an alkali metal salt of a dihydroxy aromatic compound of the formula

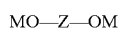

MO—Z—OM in the presence of the catalyst that catalyzes the imidization of the 3-substituted phthalic anhydride and the diamine to form the polyetherimide composition comprising: a residue of the catalyst and a polyetherimide of the formula

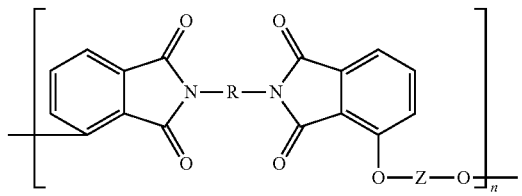

wherein in the foregoing formulae X is selected from fluoro, chloro, bromo, iodo, nitro, and combinations thereof;

R is a divalent group of the formula

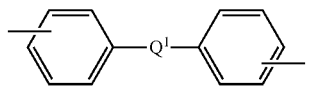

wherein $Q^1$ is —SO$_2$—; M is an alkali metal; Z is an aromatic C$_{6-24}$ monocyclic or polycyclic moiety optionally substituted with 1 to 6 C$_{1-8}$ alkyl groups, 1 to 8 halogen atoms, and combinations thereof; and n is an integer greater than 1;

wherein the polyetherimide has a Tg that is at least more than 247° C. and, wherein, the polyetherimide, in molten form, has a viscosity that is the same viscosity as the initial viscosity or less than the initial viscosity after the polyetherimide is exposed to a temperature that is at least 400° C. for at least 5 minutes, the initial viscosity being the viscosity the polyetherimide has after the polyetherimide has been exposed to at least 400° C. for six minutes.

Also disclosed herein is a polyetherimide composition comprising: (i) a polyetherimide of the formula

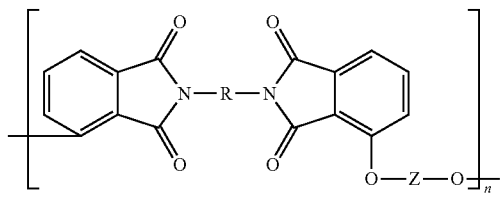

and (ii) a residue of a guanidinium catalyst and optionally, a residue of a catalyst selected from quaternary ammonium salts, quaternary phosphonium salts, pyridinium salts, imidazolium salts, and combinations thereof, the polyetherimide being a catalyzed polymerization reaction product of (1) a 3,3'-bis(phthalimide) composition comprising a catalyzed imidization product of a 3-substituted phthalic anhydride and a sulfone diamine selected from 3,3'-diaminodiphenyl sulfone, 3,4'-diaminodiphenyl sulfone, 4,4'-diamino diphenyl sulfone, and combinations thereof, and (2) an alkali metal salt of a dihydroxy aromatic compound, the imidization product being catalyzed by the catalyst;

wherein
the substituted 3-phthalic anhydride has a formula

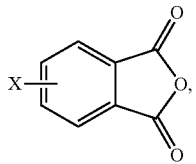

the organic diamine has a formula

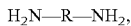

the bis(phthalimide) has a formula

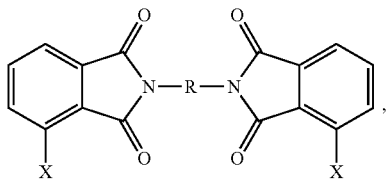

and
the alkali metal salt of the dihydroxy aromatic compound has a formula

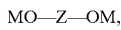

wherein in the foregoing formulae,
X is selected from fluoro, chloro, bromo, iodo, nitro, and combinations thereof;
R is selected from 3,3'-diphenylene sulfone, 3,4'-diphenylene sulfone, 4,4'-diphenylene sulfone, and combinations thereof;
M is an alkali metal;
Z is an aromatic $C_{6-24}$ monocyclic or polycyclic moiety optionally substituted with 1 to 6 $C_{1-8}$ alkyl groups, 1 to 8 halogen atoms, and combinations thereof; and
n is an integer greater than 1;
wherein the polyetherimide has a Tg that is at least more than 247° C. and,
wherein the polyetherimide, in molten form, has a viscosity that is the same viscosity as the initial viscosity or less than the initial viscosity after the polyetherimide is exposed to a temperature that is at least 400° C. for at least 5 minutes, the initial viscosity being the viscosity the polyetherimide has after the polyetherimide has been exposed to at least 400° C. for six minutes.

DETAILED DESCRIPTION OF THE INVENTION

Figure 1A:
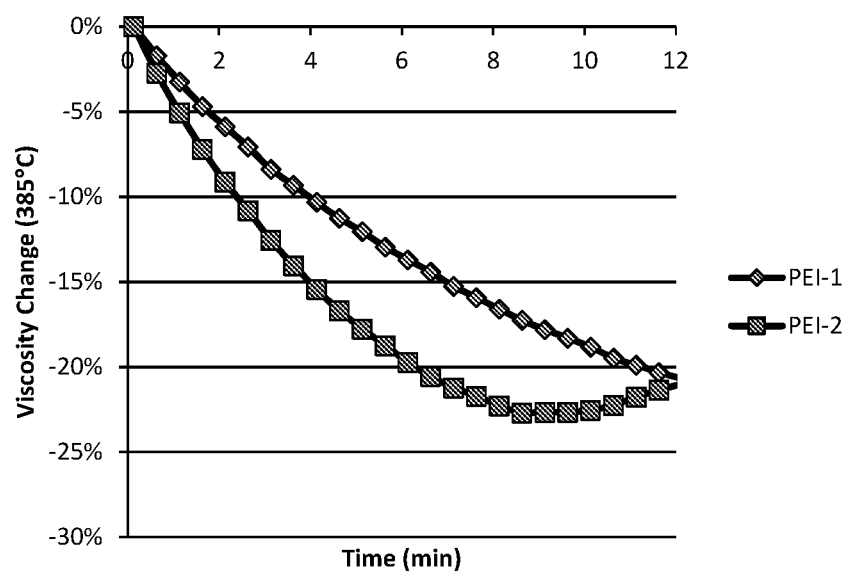
FIGS. 1a, 1b, and 1c show graphs showing the dynamic oscillatory rheology curves of two 3,3'-isomer polyetherimide sulfone polymers polymerized via the chloro-displacement method using two different catalysts (HEG-Cl (PEI-1) and SPP (PEI-2)) in the imidization step at (a) 385° C., (b) 400° C., and (c) 410° C.
Figure 1B:
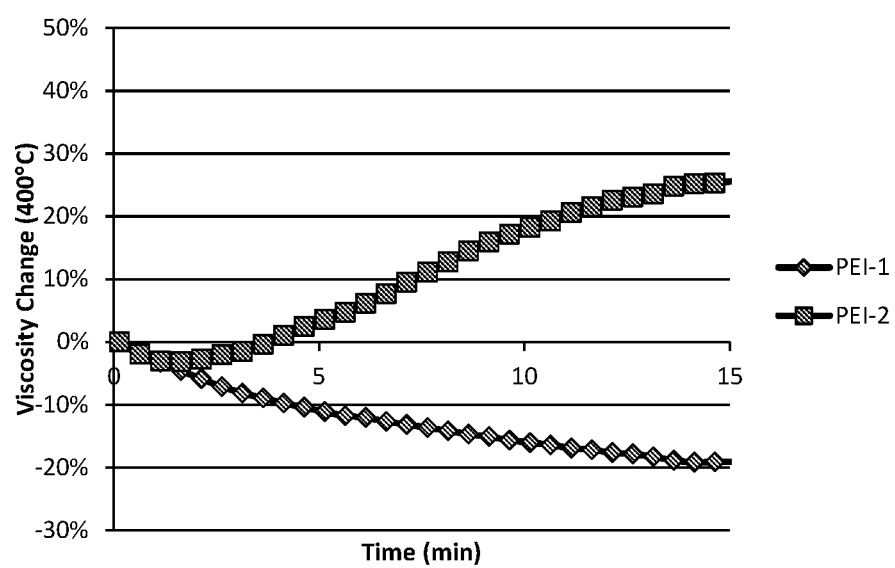
Figure 1C:
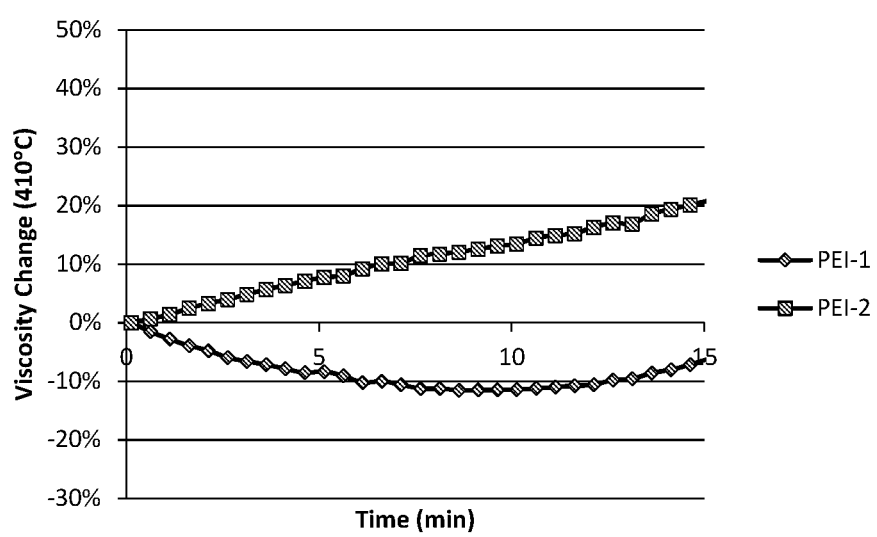

The present inventors have discovered a surprising improvement in 3'3'-isomer-based chloro displaced polyetherimides. These polyetherimides have a Tg at least 20° C. higher than polyetherimides based on 4,4'-isomer based chloro displaced PEIs, which makes the 3,3'-isomer-based chloro displaced polyetherimides useful in higher temperature molding applications. The present inventors have discovered that 3,3'-isomer-based chloro displaced polyetherimides prepared without the use of SPP catalyst have a surprising improvement in melt stability compared to 3,3'-isomer-based chloro displaced polyetherimides prepared with SPP catalyst. In a particularly advantageous feature, these polymers have an improved melt stability as demonstrated by the viscosity of the resin remaining stable at high temperature molding conditions, e.g., at temperature of 775° F. (410° C.) for 9 minutes.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed in this patent application. Because these ranges are continuous, they include every value between the minimum and maximum values. Unless expressly indicated otherwise, the various numerical ranges specified in this application are approximations. The endpoints of all ranges directed to the same component or property are inclusive of the endpoint and independently combinable.

All molecular weights in this application refer to weight average molecular weights unless indicated otherwise. All such mentioned molecular weights are expressed in Daltons.

The terms "a" and "an" do not denote a limitation of quantity, but rather denote the presence of at least one of the referenced item. "Or" means "and/or." As used herein, "combination thereof" is inclusive of one or more of the recited elements, optionally together with a like element not recited. Reference throughout the specification to "one embodiment," "another embodiment," "an embodiment," "some embodiments," and so forth, means that a particular element (e.g., feature, structure, property, and/or characteristic) described in connection with the embodiment is included in at least one embodiment described herein, and may or may not be present in other embodiments. In addition, it is to be understood that the described element(s) can be combined in any suitable manner in the various embodiments.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group. The term "alkyl" includes both $C_{1-30}$ branched and straight chain, unsaturated aliphatic hydrocarbon groups having the specified number of carbon atoms. Examples of alkyl include, but are not limited to, methyl, ethyl, n-propyl, i-propyl, n-butyl, s-butyl, t-butyl, n-pentyl, s-pentyl, n- and s-hexyl, n- and s-heptyl, and, n- and s-octyl. The term "aryl" means an aromatic moiety containing the specified number of carbon atoms, such as to phenyl, tropone, indanyl, or naphthyl.

All ASTM tests are based on the 2003 edition of the Annual Book of ASTM Standards unless otherwise indicated.

The polyetherimides are of formula (1)

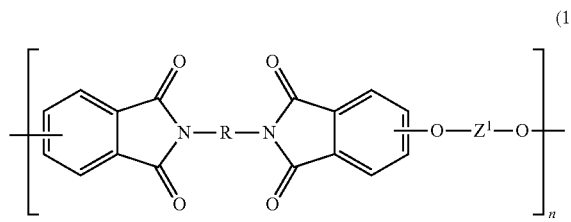

(1)

wherein n is greater than 1, for example 10 to 1,000 or more, or more specifically 10 to 500.

The group R in formula (1) is a $C_{6-27}$ aromatic hydrocarbon group or a halogenated derivative thereof, a straight or branched chain $C_{2-10}$ alkylene group or a halogenated derivative thereof, a $C_{3-20}$ cycloalkylene group or a halogenated derivative thereof, an aromatic hydrocarbyl moiety having from 1 to 6 aromatic groups, —$(C_6H_{10})_z$— wherein z is an integer from 1 to 4, or a divalent group of formula (2)

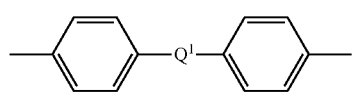

(2)

wherein $Q^1$ is a single bond, —O—, —S—, —C(O)—, —$SO_2$—, —SO—, —$C_yH_{2y}$— a halogenated derivative thereof wherein y is an integer from 1 to 5, including perfluoroalkylene groups, or —$(C_6H_{10})_z$— wherein z is an integer from 1 to 4. In an embodiment, R is a divalent group of formulas (3)

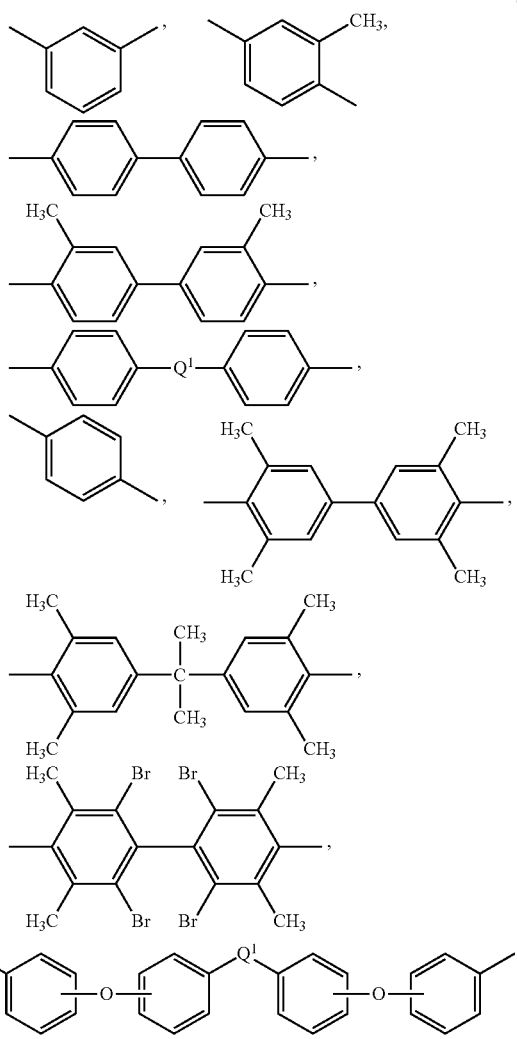

(3)

wherein $Q^1$ is —O—, —S—, —C(O)—, —$SO_2$—, —SO—, —$C_yH_{2y}$— wherein y is an integer from 1 to 5 or a halogenated derivative thereof, including perfluoroalkylene groups, or —$(C_6H_{10})_z$— wherein z is an integer from 1 to 4. In some embodiments, R is the diether aromatic moiety having four phenylene groups wherein Q is a direct bond, —O—, —S—, —C(O)—, —$SO_2$—, —SO—, —$C_yH_{2y}$— and a halogenated derivative thereof wherein y is an integer from 1 to 5, or —$(C_6H_{10})_z$— wherein z is an integer from 1 to 4. In some embodiments, R is m-phenylene, p-phenylene, or a diarylsulfone. The diarylsulfone can be, for example, 4,4'-diphenylsulfone. Embodiments where R is a divalent arylene ether can also be specifically mentioned, for example, an arylene ether of the formula

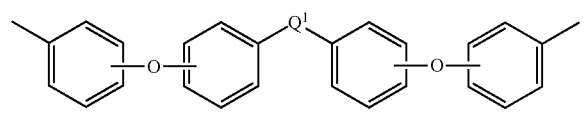

(3a)

wherein $Q^1$ is selected from a direct bond, —O—, —S—, —C(O)—, —$SO_2$—, —SO—, —$C_yH_{2y}$— and a halogenated derivative thereof wherein y is an integer from 1 to 5, and —(C$_6$H$_{10}$)$_z$— wherein z is an integer from 1 to 4. In an embodiment, Q$^1$ in formula (3a) is —O—.

The group Z$^1$ in formula (1) is a substituted or unsubstituted divalent organic group, and can be an aromatic C$_{6-24}$ monocyclic or polycyclic moiety optionally substituted with 1 to 6 C$_{1-8}$ alkyl groups, 1 to 8 halogen atoms, or a combination thereof, provided that the valence of Z is not exceeded. Exemplary groups Z$^1$ include groups of formula (4)

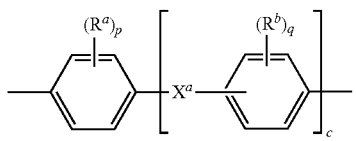

(4)

wherein R$^a$ and R$^b$ are each independently a halogen atom or a monovalent hydrocarbon group; p and q are each independently integers of 0 to 4; c is zero to 4; and X$^a$ is a bridging group connecting the two hydroxy-substituted aromatic groups, wherein the bridging group and the hydroxy substituent of each C$_6$ arylene group are disposed ortho, meta, or para (specifically para) to each other on the C$_6$ arylene group. The bridging group X$^a$ can be a single bond, —O—, —S—, —S(O)—, —S(O)$_2$—, —C(O)—, or a C$_{1-18}$ organic bridging group. The C$_{1-18}$ organic bridging group can be cyclic or acyclic, aromatic or non-aromatic, and can further comprise heteroatoms such as halogens, oxygen, nitrogen, sulfur, silicon, or phosphorous. The C$_{1-18}$ organic group can be disposed such that the C$_6$ arylene groups connected thereto are each connected to a common alkylidene carbon or to different carbons of the C$_{1-18}$ organic bridging group. A specific example of a group Z$^1$ is a divalent group of formula (4a)

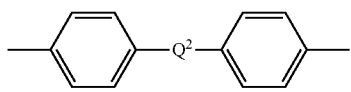

(4a)

wherein Q$^2$ is —O—, —S—, —C(O)—, —SO$_2$—, —SO—, —C$_y$H$_{2y}$— wherein y is an integer from 1 to 5 and halogenated derivatives thereof, including perfluoroalkylene groups. In a specific embodiment Q is 2,2-isopropylidene.

In another specific embodiment, the polyetherimide comprises more than 1, specifically 10 to 1,000, or more specifically, 10 to 500 structural units, of formula (1) wherein R is a divalent group of formulas (3) wherein Q$^1$ is —C$_y$H$_{2y}$— wherein y is an integer from 1 to 5 or a halogenated derivative thereof, and Z is a group of formula (4a). In a specific embodiment, R is m-phenylene, p-arylene diphenylsulfone, or a combination thereof, and Z$^1$ is 2,2-(4-phenylene)isopropylidene. An example of a polyetherimide sulfone comprises structural units of formula (1) wherein at least 50 mole percent of the R groups are of formula (2) wherein Q is —SO$_2$— and the remaining R groups are independently p-phenylene or m-phenylene or a combination comprising at least one of the foregoing; and Z$^1$ is 2,2-(4-phenylene)isopropylidene.

The polyetherimides can optionally comprise additional structural imide units, for example imide units of formula (5)

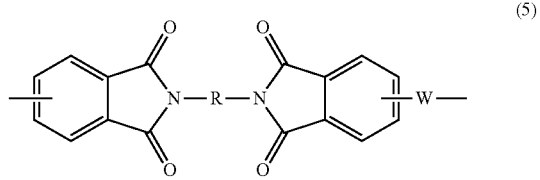

(5)

wherein R is as described in formula (1) and W is a linker of formulas (6).

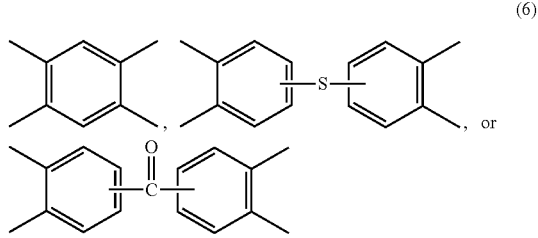

(6)

These additional structural imide units can be present in amounts ranging from 0 to 10 mole % of the total number of units, specifically 0 to 5 mole %, more specifically 0 to 2 mole %. In an embodiment no additional imide units are present in the polyetherimides.

The polyetherimides are prepared by the so-called "halo-displacement" or "chloro-displacement" method. In this method, a halophthalic anhydride of formula (7)

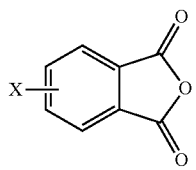

(7)

wherein X is a halogen, is condensed (imidized) with an organic diamine of the formula (8)

H$_2$N—R—NH$_2$ (8)

wherein R is as described in formula (1), to form a bis (halophthalimide) of formula (9).

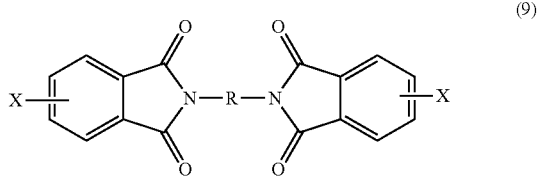

(9)

In an embodiment, X is a halogen, specifically fluoro, chloro, bromo, or iodo, more specifically chloro. A combination of different halogens can be used.

In an embodiment the bis(halophthalimide)s (9) can be formed from a haolphthalimide composition containing 3-halophthalic anhydride (7a) and 4-halophthalic anhydride (7b)

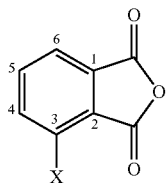 (7a)

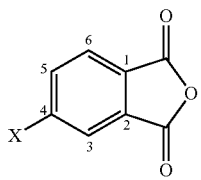 (7b)

to provide the 3,3'-bis(halophthalimide) (9a), the 3,4'-bis(halophthalimide) (9b), and/or the 4,4'-bis(halophthalimide) (9c).

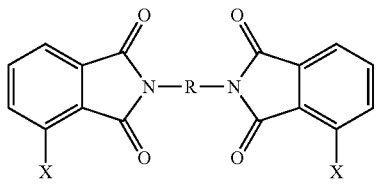 (9a)

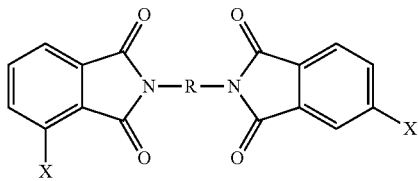 (9b)

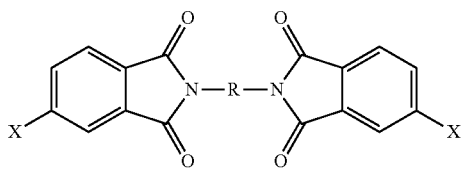 (9c)

As can be seen from formula (9b), when R is symmetrical (e.g., a 1,3-phenylene or 1,4-phenylene) the 3,4'- and 3,4' isomers are the same, but when R is not symmetrical (e.g., 1-methyl-2,3-phenylene) the 3,4' and 4,3' regioisomers are not the same. Reference to the 3,4' isomer herein and in the claims specifically includes the 4,3' isomer irrespective of whether R is symmetrical. In a specific embodiment, a combination of 3-chlorophthalic anhydride (3-ClPA), 4-chlorophthalic anhydride (4-ClPA) and a diamine (8) (e.g., meta-phenylene diamine) are reacted to produce the bis (chlorophthalimide) (ClPAMI) composition as a mixture of the 3,3'-bis(chlorophthalimide) (3,3'-ClPAMI) (1,3-bis[N-(3-chlorophthalimido)]benzene), the 3,4'-bis(chlorophthalimide) (3,4'-ClPAMI) (1,1,3-bis[N-(3-chlorophthalimido, 4-chlorophthalimido)]benzene), and the 4,4'-bis(chlorophthalimide) (4,4'-ClPAMI) (1,3-bis[N-(4-chlorophthalimido)]benzene).

In an embodiment, the halophthalic anhydride composition comprises 3-halophthalic anhydride, for example, halophthalic anhydride compositions containing a major proportion of 3-halopthalic anhydride may be employed, for example 90 wt %, 91 wt %, 92 wt %, 93 wt %, 94 wt %, 95 wt %, 96 wt %, 97 wt %, 98 wt %, 99 wt %, 99.5 wt %, 99.8 wt %, 99.9 wt %, 100 wt % of a 3-halopthalic anhydride, along with minor amounts of 4-halopthalic anhydride, such as 10 wt %, 9 wt %, 8 wt %, 7 wt %, 6 wt %, 5 wt %, 4 wt %, 3 wt %, 2 wt %, 1 wt %, 0.5 wt %, 0.2 wt %, 0.1 wt %, trace amounts, etc. For example, 98 wt % to 100 wt % of a 3-halopthalic anhydride and from more than 0 wt % to 2 wt % of a 4-halophthalimide.

Illustrative examples of amine compounds of formula (8) include ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis (4-aminophenyl) propane, 2,4-bis(b-amino-t-butyl) toluene, bis(p-b-amino-t-butylphenyl) ether, bis(p-b-methyl-o-aminophenyl)benzene, bis(p-b-methyl-o-aminopentyl)benzene, 1,3-diamino-4-isopropylbenzene, bis(4-aminophenyl) ether and 1,3-bis(3-aminopropyl)tetramethyldisiloxane. Mixtures of these amines can be used. Illustrative examples of amine compounds of formula (8) containing sulfone groups include diamino diphenyl sulfone (DDS) and bis (aminophenoxy phenyl) sulfones (BAPS). Combinations comprising any of the foregoing amines can be used.

Specifically, diamine (8) is a meta-phenylene diamine (8a) or a para-phenylene diamine (8b)

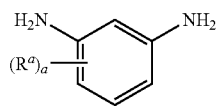 (8a)

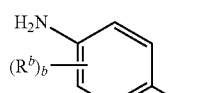 (8b)

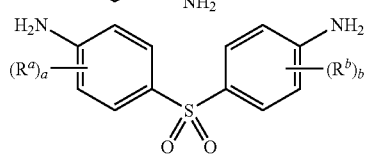

wherein $R^a$ and $R^b$ are each independently a halogen atom, nitro, cyano, $C_2$-$C_{20}$ aliphatic group, $C_2$-$C_{40}$ aromatic group, and a and b are each independently 0 to 4. Specific examples include meta-phenylenediamine (mDA), para-phenylenediamine (pDA), 2,4-diaminotoluene, 2,6-diaminotoluene, 2-methyl-4,6-diethyl-1,3-phenylenediamine, 5-methyl-4,6- diethyl-1,3-phenylenediamine, 1,3-diamino-4-isopropylbenzene, and 4,4'-diamino diphenyl sulfone. In some embodiments, diamine (8) is selected from meta-phenylene diamine, para-phenylene diamine, 4,4'-diamino diphenyl sulfone, and a combination thereof.

Condensation of halophthalic anhydride (7) and diamine (8) (imidization) can be conducted in the absence or presence of a catalyst.

Known phase transfer catalysts for imidization include sodium phenyl phosphinate (SPP), acetic acid, benzoic acid, phthalic acid, or substituted derivatives thereof. Often, sodium phenyl phosphinate has been used as the imidization catalyst.

We have found that polyetherimide products of 3,3'-bis (halophthalimide) produced without SPP catalyst have surprisingly improved melt stability as compared to those prepared with SPP. The non-SPP catalysts include a quaternary ammonium salt, a quaternary phosphonium salt, a guanidinium salt, a pyridinium salt, an imidazolium salt, and combinations thereof.

The imidization catalyst is selected from quaternary ammonium salts, quaternary phosphonium salts, guanidinium salts, pyridinium salts, imidazolium salts, and combinations thereof. A combination of different salts can be used. The foregoing salts include an anionic component, which is not particularly limited. Examples of anions include chloride, bromide, iodide, sulfate, phosphate, acetate, mesylate, tosylate, and the like. A combination of different anions can be used. Salts are frequently referred to by the identity of the anion and as such the quaternary ammonium, quaternary phosphonium, guanidinium, pyridinium or imidazolium salt may be a halide salt, nitrate salt, nitrite salt, boron-containing salt, antimony-containing salt, phosphate salt, carbonate salt, carboxylate salt or a combination of two or more of the foregoing. The foregoing salts are of the formula $G_4N^+Y^-$ and $G_4P^+Y^-$, where each $Y^-$ is independently an anionic component, which is not particularly limited, and each G is independently $C_{1-32}$ acyl, $C_{2-32}$ alkenyl or alkynyl, $C_{3-8}$ cycloalkyl, $C_{6-24}$ aryl, $C_{7-24}$ arylalkylene (e.g., benzyl), $di(C_{1-32}$ alkyl)amino, and $C_{3-9}$ heteroaryl containing 1 to 3 heteroatoms (N, P, O, S, or a combination thereof). Each of the foregoing groups can optionally be substituted with 1 to 4 substituents such as $C_{1-6}$ alkyl, $C_{1-6}$ alkoxy, nitro, cyano, halogen, $di(C_{1-32}$ alkyl) amino, $C_{1-6}$ alkylcarbonyloxy (e.g., $H_3CC(O)O—$), $_{2-32}$ alkenyl or alkynyl, $C_{3-8}$ cycloalkyl, $C_{6-24}$ aryl, $C_{7-24}$ arylalkylene, or $C_{3-9}$ heteroaryl, provided that the valence of the group G is not exceeded.

Examples of quaternary ammonium salts include tetra($C_{1-16}$ alkyl) ammonium salts, tetra($C_{6-24}$)aryl ammonium salts, and tetra($C_{7-24}$ arylalkylene) ammonium salts.

Examples of specific tetra($C_{1-16}$ alkyl) ammonium salts include tetraethylammonium bromide, tetrapropylammonium bromide, tetrabutylammonium iodide, tetrabutylammonium bromide, tetrabutylammonium chloride, tetrabutylammonium fluoride, tetrabutylammonium acetate, tetrahexylammonium chloride, tetraheptylammonium chloride, benzyltriethylammonium bromide, hexadecyltrimethylammonium bromide, ALIQUAT 336 (methyltrioctylammonium chloride), ADOGEN 464 (methyltri($C_8$-$C_{10}$ alkyl) ammonium chloride), and 1,6-bis(tributylammonium) hexane dibromide. Examples of tetra($C_{6-24}$)aryl ammonium salts include tetraphenylammonium bromide.

Dialkyl heterocycloaliphatic salts (16) can be used:

(16)

wherein $R^{24}$ and $R^{25}$ are each independently an alkyl groups having 1 to 4 carbons and n equals 4 to 6, o is an integer from 1 to 12, and $Y^-$ is defined as above.

Bis-alkyl quaternary ammonium salts (17) can be used:

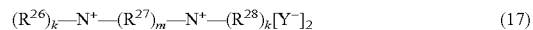

(17)

wherein $R^{26}$ and $R^{28}$ are each independently an alkyl having 1 to 12 carbons, each $R^{27}$ is a hydrocarbyl group having 1 to 12 carbons provided that all $R^{27}$ groups, taken together, have 4 to 12 carbons, k is an integer from 1 to 3, and m is 4-k provided that at least three of the $R^{26}$, $R^{27}$ and $R^{28}$ are aliphatic or alicyclic, and $Y^-$ is defined as above.

Quaternary phosphonium salts include tetra($C_{1-16}$)alkyl, tetra($C_{6-24}$)aryl, mixed ($C_{7-24}$ arylalkylene)($C_{1-16}$alkyl), and mixed ($C_{6-24}$aryl)($C_{1-16}$alkyl)phosphonium salts, and phosphazenium salts. Examples of quaternary phosphonium salts include tetrabutylphosphonium bromide, tetrabutylphosphonium chloride, methylbenzyltriphenylphosphonium bromide, tetraphenylphosphonium bromide, and trihexyl-tetradecylphosphonium chloride.

Quaternary pyridinium salts include $C_{1-8}$alkyl pyridinium salts, N—($C_{1-10}$alkyl)-4-di($C_{1-10}$)alkylaminopyridinium salts, bis(($C_{1-12}$)alkyl pyridinium) salts.

Examples of N—($C_{1-10}$)alkyl-4-di($C_{1-10}$)alkylpyridinium salts include N-butyl-4-dimethylaminopyridinium chloride, N-2-ethylhexyl-4-dimethylaminopyridinium chloride, N-2-ethylexyl-4-methylpiperidinylpyridinium chloride, N-2-ethylhexyl-4-dibutylaminopyridinium chloride, N-2-ethylhexyl-4-dihexylaminopyridinium chloride, and N-neopentyl-4-dihexylaminopyridinium bromide. Examples of bis(($C_{1-12}$)alkyl pyridinium) salts include tetraethylene glycol bis-(4-dimethylaminopyridinium)bis-methanesulfonate, 1,8-bis(4-dimethylaminopyridinium)octane dibromide, 1,6-bis(4-dihexylaminopyridinium)hexane dibromide, 1,8-bis(4-dihexylaminopyridinium)octane dibromide, and 1,10-bis(4-dihexylaminopyridinium)decane dibromide. Examples of ($C_{1-8}$)alkylimidazolium salts include 1-butyl-2,3-dimethylimidazolium chloride and 1-butyl-2,3-dimethylimidazolium tetrafluoroborate.

Dialkylaminopyridinium salts (14) can be used:

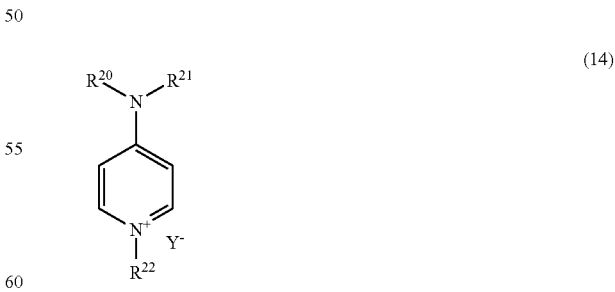

(14)

wherein $R^{20}$ and $R^{21}$ are hydrocarbyl groups having 1 to 13 carbons. The hydrocarbyl groups may be substituted or unsubstituted and branched or not branched. $R^{20}$ and $R^{21}$ together can form a cyclic hydrocarbyl group. $R^{22}$ is a linear or branched alkyl group having 4 to 12 carbons. $Y^-$ is as defined above.

Dialkylaminopyridinium salts (15) can also be used:

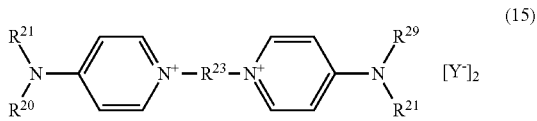

(15)

wherein $R^{20}$, $R^{21}$, and $Y^-$ are defined as above. $R^{23}$ is a linear hydrocarbyl having 4 to 25 carbon atoms.

Imidazolinium salts include $(C_{1-8})$alkylimidazolium salts, and benzimidazolium salts.

Guanidinium salts (12) can be used

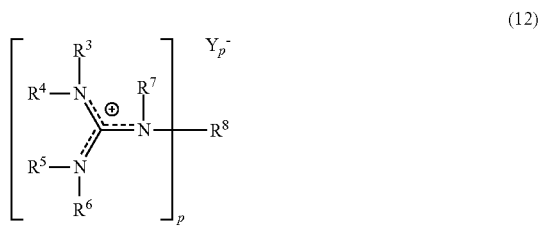

(12)

wherein each of $R^3$, $R^4$, $R^5$, $R^6$ and $R^7$ is a $C_{1-12}$ primary alkyl radical and $R^8$ is a $C_{1-12}$ primary alkyl or $C_{2-12}$ primary alkylene radical, or at least one of the $R^3$-$R^4$, $R^5$-$R^6$ and $R^7$-$R^8$ combinations with the connecting nitrogen atom forms a heterocyclic radical; $Y^-$ is an anion; and n is 1 or 2. The alkyl radicals suitable as $R^3$-$R^6$ include primary alkyl radicals, generally containing about 1-12 carbon atoms. $R^7$ is usually an alkyl radical of the same structure as $R^3$-$R^6$ or a $C_{2-12}$ alkylene radical in which the terminal carbons are primary; most preferably, it is $C_{2-6}$ alkyl or $C_{4-8}$ straight chain alkylene. Alternatively, any combination of $R^3$-$R^8$ and the corresponding nitrogen atom(s) may form a heterocyclic radical such as piperidino, pyrrolo, or morpholino. $Y^-$ can be any anion, for example the conjugate base of a strong acid. Specific examples of $Y^-$ are chloride, bromide, and methanesulfonate. The value of p is 1 or 2 depending on whether $R^7$ is alkyl or alkylene. Specific guanidinium salts include hexa($C_{1-6}$)alkylguanidinium and α,ω-bis(penta($C_{1-6}$)alkylguanidinium)($C_{1-6}$)alkane, and salts such as hexaethylguanidinium chloride, hexaethylguanidinium bromide, hexa-n-butylguanidinium bromide, and tris(piperidino)guanidinium bromide, 1,6-bis(N,N',N',N'',N''-penta-n-butylguanidinium) hexane dibromide and 1,6-bis(N-n-butyl-N',N',N''N''-tetra-ethylguanidinium)hexane dibromide.

Guanidinium salts include bis-guanidinium alkane salts of structure (13):

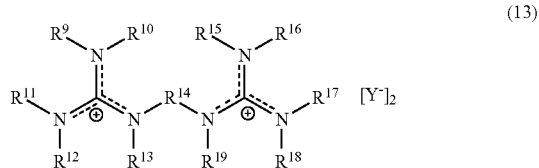

(13)

wherein $R^9$-$R^{13}$ and $R^{15}$-$R^{19}$ are each independently selected from the group comprising alkyl, cyclo alkyl, aryl, and aryl alkyl and have 1 to 20 carbons. $R^{14}$ is an alkylene group having 2 to 12 carbons, or, more specifically, 4 to 8 carbons. In some embodiments $R^9$-$R^{13}$ and $R^{15}$-$R^{19}$ are each independently alkyl groups having 1 to 12, or, more specifically, 2 to 6 carbons. In some embodiments $R^6$ is non-branched. $Y^-$ can be any suitable anion referred to in the preceding paragraph and in some embodiments is the anion of a strong acid such as chloride or bromide.

A catalytically active amount of the imidization catalyst can be determined by one of skill in the art without undue experimentation, and can be, for example, more than 0 to 5 mole percent, specifically 0.01 to 2 mole percent, and more specifically 0.1 to 1.5 mole percent, and still more specifically 0.2 to 1.0 mole percent based on the moles of organic diamine (8). The catalyst for the bis(phthalimide) composition can consist essentially, or consist of the foregoing quaternary ammonium salts, quaternary phosphonium salts, guanidinium salts, pyridinium salts, imidazolium salts, and combinations thereof. In some embodiments, the foregoing bis(phthalimide) compositions have less than 100 parts per million (ppm) by weight of the composition of a sodium aryl phosphinate salt, or no detectable amount of a sodium aryl phosphinate salt. As used herein, no detectable amount means that the amount is not detectable by HPLC that has a detection limit of 25 ppm.

Specifically, the catalyst for the bis(phthalimide) composition can consist essentially, or consist of a guanidinium salt, such as a hexaethylguanidinium salt. In some embodiments, these bis(phthalimide) compositions have less than 100 ppm by weight of the bis(phthalimide) of a sodium aryl phosphinate salt, or no detectable amount of a sodium aryl phosphinate salt. Guanidinium salts have enhanced stability over other quaternary ammonium salts. Without being bound by theory, the delocalized nature of the positive charge (which is spread over the three nitrogen atoms and the carbon atom connecting them) is believed to stabilize the catalyst against decomposition at the reaction temperatures used, and thereby increase the effective amount for catalysis present throughout the reaction in comparison to other quaternary ammonium salts. Also, a major decomposition pathway in quaternary ammonium salts is dehydroamination to form an amine and an olefin. When the quaternary ammonium salt is a guanidinium salt, the leaving group is a guanidine, a stronger base, and therefore a weaker leaving group, than the amine that is formed in the decomposition of other quaternary ammonium salts. Thus decomposition of guanidinium salts is less energetically favored than decomposition of other quaternary ammonium salts.

The imidization catalyst can be added any time during the imidization reaction between the substituted phthalic anhydride and the organic diamine. For example, the imidization catalyst can be added at the beginning of the reaction, at the end of the reaction, or anytime during the reaction. The imidization catalyst can also be added continuously or in portions during the course of the reaction. An amount of imidization catalyst effective to catalyze the imidization of the substituted phthalic anhydride and the organic diamine can be added at the beginning of the reaction, for example about 0.2 mole %, based on the moles of organic diamine, and an additional amount can be added at the end of the reaction, to serve as the polymerization catalyst for the manufacture of the polyetherimide.

The imidization reaction is generally conducted in the presence of a relatively non-polar solvent, specifically with a boiling point above about 100° C., and more specifically above about 150° C., for example o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned.

The bis(phthalimide)s (9) are generally prepared at least 110° C., specifically 150° to 275° C., more specifically 175° to 225° C. At temperatures below 110° C., reaction rates may be too slow for economical operation. Atmospheric or super-atmospheric pressures can be used, for example up to 5 atmospheres, to facilitate the use of high temperatures without causing solvent to be lost by evaporation.

The reaction of the substituted phthalic anhydride (7) with the organic diamine (8) to form bis(phthalimide) (9) is generally conducted for about 0.5 to about 30 hours, specifically about 1 to about 20 hours, more specifically about 1 to about 10 hours, still more specifically about 2 to about 8 hours, and yet more specifically about 3 to about 7 hours. Advantageously, conversion to the bis(phthalimide) is 99% complete, based on the moles of the substituted phthalic anhydride, in less than 6 hours.

The solvent, organic diamine (8) and substituted phthalic anhydride (7) can be combined in amounts such that the total solids content during the reaction to form bis(phthalimide) (9) does not exceed about 25 weight percent (wt %), or about 17 wt %. "Total solids content" expresses the proportion of the reactants as a percentage of the total weight including liquids present in the reaction at any given time.

A molar ratio of halophthalic anhydride (7) to diamine (8) of 1.98:1 to 2.04:1, specifically 2:1 is used. While other ratios may be employed, a slight excess of anhydride or diamine may be desirable. A proper stoichiometric balance between halophthalic anhydride (7) and diamine (8) is maintained to prevent undesirable by-products that can limit the molecular weight of the polymer, and/or result in polymers with amine end groups. Accordingly, in an embodiment, imidization proceeds adding diamine (8) to a mixture of halophthalic anhydride (7) and solvent to form a reaction mixture having a targeted initial molar ratio of halophthalic anhydride to diamine; heating the reaction mixture to a temperature of at least 100° C. (optionally in the presence of an imidization catalyst); analyzing the molar ratio of the heated reaction mixture to determine the actual initial molar ratio of halophthalic anhydride (7) to diamine (8); and, if necessary, adding halophthalic anhydride (7) or diamine (8) to the analyzed reaction mixture to adjust the molar ratio of halophthalic anhydride (7) to diamine (8) to 2.01 to 2.3.

After imidization, the bis(halophthalimide) (8) is polymerized by reaction with an alkali metal salt of a dihydroxy aromatic compound to provide the polyetherimide (1). In particular, the halogen group X of bis(halophthalimide) (9)

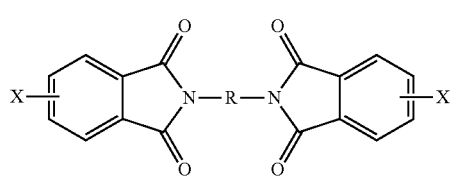

(9)

is displaced by reaction with an alkali metal salt of a dihydroxy aromatic compound of formula (10)

(10)

wherein $M^1$ is an alkali metal and $Z^1$ is as described in formula (1), to provide the polyetherimide of formula (1)

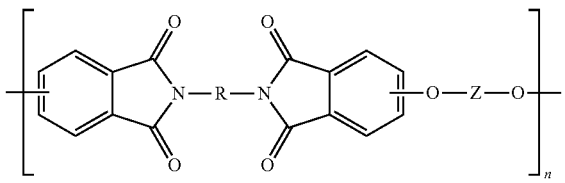

(1)

wherein n, R, and $Z^1$ are as defined above.

Alkali metal $M^1$ can each independently be any alkali metal, for example lithium, sodium, potassium, and cesium, and can be the same as $M^2$. Thus alkali metal salt (10) is selected from lithium salts, sodium salts, potassium salts, cesium salts, and a combination thereof. Specific metals are potassium or sodium. In some embodiments, M1 is sodium. The alkali metal salt (10) can be obtained by reaction of the metal with an aromatic dihydroxy compound of formula (4), specifically an aromatic $C_{6-24}$ monocyclic or polycyclic dihydroxy compound optionally substituted with 1 to 6 $C_{1-8}$ alkyl groups, 1 to 8 halogen atoms, or a combination thereof, for example a bisphenol compound of formula (11):

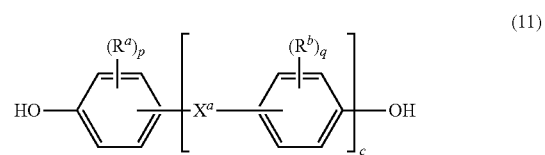

(11)

wherein $R^a$, $R^b$, and $X^a$ are as described in formula (3). In a specific embodiment the dihydroxy compound corresponding to formulas (4a) can be used. The compound 2,2-bis(4-hydroxyphenyl) propane ("bisphenol A" or "BPA") can be used.

The polymerization is conducted in the presence of an alkali metal salt of a monohydroxy aromatic compound of formula (12)

$M^2O-Z^2$ (12)

wherein $M^2$ is an alkali metal and $Z^2$ is a monohydroxy aromatic compound. It has been found by the inventors hereof that when the amount of the monohydroxy aromatic salt (12) is greater or equal to 5 mole percent, based on the total moles of the alkali metal salts (10) and (12), a polyetherimide having a weight average molecular weight from more than 200 to less than 43,000 Daltons can be obtained as further described below.

Further, as described in more detail below, the polyetherimides can have low residual contents and good physical properties. The amount of monohydroxy aromatic salt (12) can also be from greater than or equal to 6 to 15 mole percent, or from greater than or equal to 6 to 10 mole percent, based on the total moles of the alkali metal salts (10) and (12). For example, the amount of monohydroxy aromatic salt (12) can be greater than or equal to 5 mole percent to 15, 14, 13, 12, 11, 10, 9, 8, or 7 mole percent.

Alkali metal $M^2$ can be any alkali metal, for example lithium, sodium, potassium, and cerium, and is generally the same as the alkali metal $M^1$. Thus alkali metal salt (12) is selected from lithium salts, sodium salts, potassium salts, cesium salts, and a combination thereof. Specific metals are potassium or sodium. In some embodiments, $M^2$ is sodium. The alkali metal salt (12) can be obtained by reaction of the metal $M^2$ with aromatic $C_{6-24}$ monocyclic or polycyclic monohydroxy compound optionally substituted with 1 to 6 $C_{1-8}$ alkyl groups, 1 to 8 halogen atoms, or a combination thereof, for example, a monohydroxy aromatic compound formula (13)

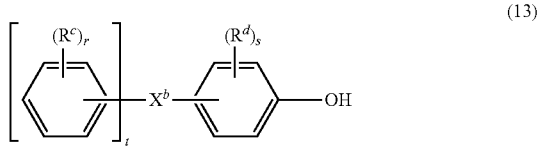
(13)

wherein $R^c$ and $R^d$ are each independently a halogen atom or a monovalent hydrocarbon group; r and s are each independently integers of 0 to 4; c is zero to 4; t is 0 or 1; when t is zero, $X^b$ is hydrogen or a $C_{1-18}$ alkyl group; and when t is 1, $X^b$ is a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic bridging group can be disposed such that the $C_6$ arylene groups connected thereto are each connected to a common alkylidene carbon or to different carbons of the $C_{1-18}$ organic bridging group. In some embodiments t is zero and $X^b$ is hydrogen or a $C_{4-12}$ alkyl group or t is one and $X^b$ is a single bond or a $C_{1-9}$ alkylene group.

In an embodiment $Z^2$ is a group of formulas

(13a)

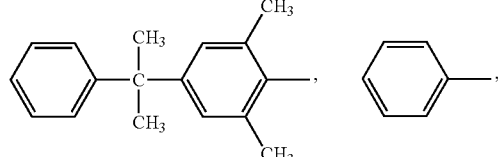

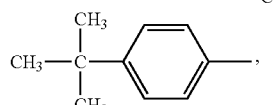

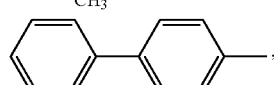

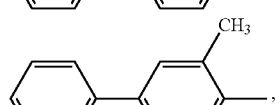

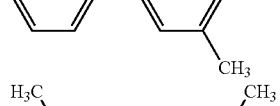

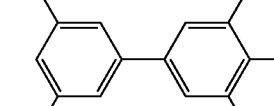

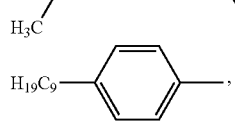

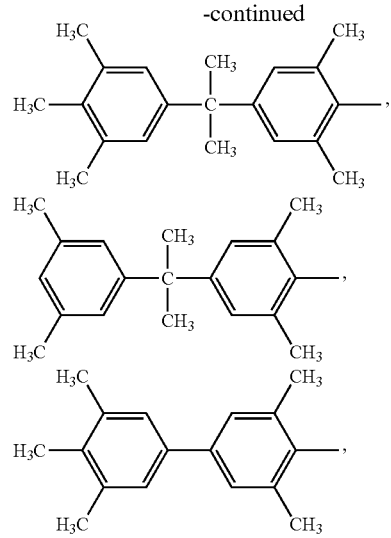

and a combination thereof.

In some embodiments, $Z^1$ and $Z^2$ are each independently a $C_{12-24}$ polycyclic hydrocarbyl moiety optionally substituted with 1 to 6 $C_{1-8}$ alkyl groups. In some embodiments, $M^1$ and $M^2$ are each sodium. For example, in some embodiments, $Z^1$ is a divalent group having formula

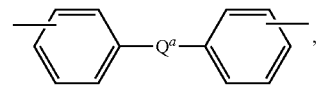

and
$Z^2$ is a monovalent group having formula

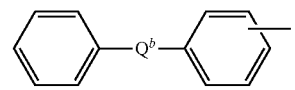

wherein $Q^a$ and $Q^b$ are each independently selected from a single bond, —O—, —S—, —C(O)—, —SO$_2$—, —SO—, —C$_y$H$_{2y}$— wherein y is an integer from 1 to 5, —(C$_6$H$_{10}$)$_z$— wherein z is an integer from 1 to 4; and a halogenated derivative thereof; and R is selected from a divalent group having the formula

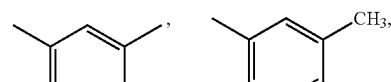

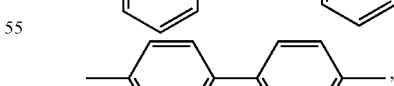

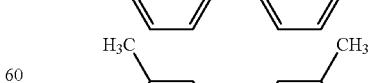

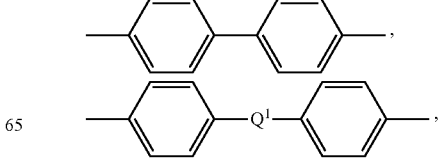

-continued

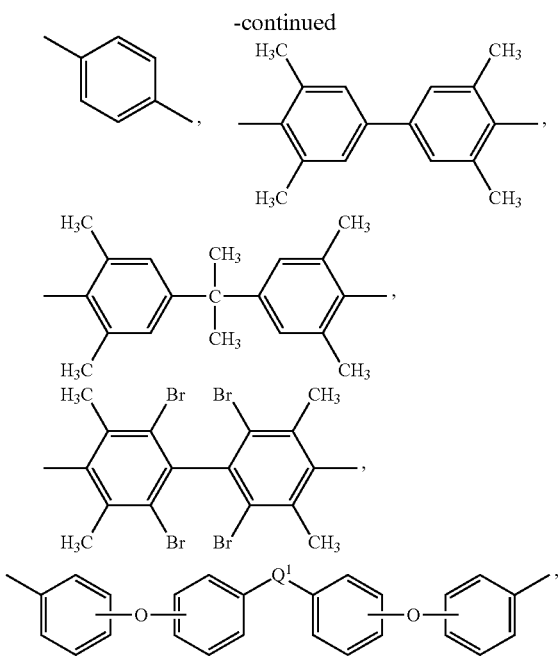

and a combination thereof, wherein Q is selected from a single bond, —O—, —S—, —C(O)—, —SO$_2$—, —SO—, —C$_y$H$_{2y}$— and a halogenated derivative thereof wherein y is an integer from 1 to 5, and —(C$_6$H$_{10}$)$_z$— wherein z is an integer from 1 to 4.

Polymerization by reaction of bis(halophthalimide) (9) with a combination of alkali metal salts (10) and (12) can be in the presence or absence of a phase transfer catalyst that is substantially stable under the reaction conditions used, in particular temperatures. Exemplary phase transfer catalysts for polymerization include hexaalkylguanidinium and α,ω-bis(pentaalkylguanidinium)alkane salts. Both types of salts can be referred to herein as "guanidinium salts."

Polymerization is generally conducted in the presence of a relatively non-polar solvent, preferably with a boiling point above 100° C., specifically above 150° C., for example, o-dichlorobenzene, dichlorotoluene, 1,2,4-trichlorobenzene, diphenyl sulfone, a monoalkoxybenzene such as anisole, veratrole, diphenylether, or phenetole. Ortho-dichlorobenzene and anisole can be particularly mentioned. Alternatively, a polar aprotic solvent can be used, illustrative examples of which include dimethylformamide (DMF), dimethylacetamide (DMAc), dimethylsulfoxide (DMSO), and N-methylpyrrolidinone (NMP).

Polymerization can be conducted at least 110° C., specifically 150° to 275° C., more specifically 175° to 225° C. At temperatures below 110° C., reaction rates may be too slow for economical operation. Atmospheric or super-atmospheric pressures can be used, for example, up to 5 atmospheres, to facilitate the use of high temperatures without causing solvent to be lost by evaporation.

In an embodiment, the combination of alkali metal salts (10) and (12) is added to the organic solvent and the water is removed from the mixture, for example, as its azeotrope. The bis(halophthalimide) (9) is then added and water removed from the mixture, for example, as its azeotrope, followed by addition of a catalyst in a pre-dried solution in organic solvent. Water removal from the system can be accomplished in either batch, semi-continuous or continuous processes using means known in the art such as a distillation column in conjunction with one or more reactors. In an embodiment, a mixture of water and non-polar organic liquid distilling from a reactor is sent to a distillation column where water is taken off overhead and solvent is recycled back into the reactor at a rate to maintain or increase the desired solids concentration. Other methods for water removal include passing the condensed distillate through a drying bed for chemical or physical adsorption of water.

The molar ratio of the bis(halophthalimide) (9) to the alkali metal salt (10) can be 1.0:0.9 to 0.9:1.0. A solids content of the bis(halophthalimide) (9) in the polymerization can be 15 to 25 wt %, based on the total weight of the polymerization mixture.

The above amounts of metal alkali salt (12) provides polyetherimides having an excellent combination of properties, in particular, high molecular weight, good impact strength, and excellent melt flow.

In particular, the polyetherimides have a weight average molecular weight (Mw) within the ranges described above, in particular 43,000 Daltons, or less than 40,000, or less than 35,000, or less than 32,000 Daltons. Mw can be measured by gel permeation chromatography (GPC). In an embodiment, the polyetherimide has a weight average molecular weight from more than 500 Daltons to less than 43,000 Daltons. In other embodiments, the polyetherimide has a weight average molecular weight from more than 500 Daltons, or more than 1,000 Daltons, or more than 2,000 Daltons, or more than 5,000 Daltons, or more than 10,000 Daltons, to a weight average molecular weight that is less than 43,000 Daltons, 42,000 Daltons, 41,000 Daltons, 40,000 Daltons, 39,000 Daltons, 38,000 Daltons, 37,000 Daltons, 36,000 Daltons, 35,000 Daltons, 34,000 Daltons, 33,000 Daltons, 32,000 Daltons, 31,000 Daltons, 30,000 Daltons, 29,000 Daltons, 28,000 Daltons, 27,000 Daltons, 26,000 Daltons, 25,000 Daltons, 24,000 Daltons, 23,000 Daltons, 22,000 Daltons, 21,000 Daltons, or 20,000 Daltons. All combinations comprising the foregoing are specifically contemplated, for example 1,000 to less than 43,000 Daltons, or 1,000 to 40,000 Daltons, or 2,000 to less than 43,000 Daltons, or 2,000 to 40,000 Daltons. In some embodiments, the Mw can be 5,000 or 10,000 to less than 43,000 Daltons.

The polyetherimides further have a melt flow index of greater than 22 grams per 10 minute (g/10 min), as measured by American Society for Testing Materials (ASTM) D 1238 at 337° C., using a 6.7 kilogram (kg) weight. For example the melt flow index can be 22 to 60 g/10 min, when determined according to ASTM D1238, at 337° C./6.6 kg. In other embodiments, our polyetherimides have a melt flow index of greater than 22 g/10 min as measured by ASTM D 1238 at 337° C., using a 6.7 kilogram (kg) weight) to 1500 g/10 min, 1400 g/10 min, 1300 g/10 min, 1200 g/10 min, 1100 g/10 min, 1000 g/10 min, 900 g/10 min, 800 g/10 min, 700 g/10 min, 600 g/10 min, 500 g/10 min, 400 g/10 min, 300 g/10 min, 200 g/10 min, or 100 g/10 min, 50 g/10 min.

The polyetherimides also have good impact strength, in particular, an unnotched Izod impact strength of less than 25 ft-lbs/in, when determined according to ASTM D4812 at 23° C. In other embodiments, the polyetherimides shave an unnotched Izod impact strength when determined according to ASTM D4812 at 23° C. from more than 0 to a less than 25 ft-lbs/in, less than or equal to 24 ft-lbs/in, less than or equal to 23 ft-lbs/in, less than or equal to 22 ft-lbs/in, less than or equal to 21 ft-lbs/in, less than or equal to 20 ft-lbs/in, less than or equal to 19 ft-lbs/in, less than or equal to 18 ft-lbs/in, less than or equal to 17 ft-lbs/in, less than or equal to 16 ft-lbs/in, less than or equal to 15 ft-lbs/in, less than or equal to 14 ft-lbs/in, less than or equal to 13 ft-lbs/in, less than or equal to 12 ft-lbs/in, less than or equal to 11 ft-lbs/in, less than or equal to 10 ft-lbs/in, less than or equal to 9 ft-lbs/in, less than or equal to 8 ft-lbs/in, less than or equal to 7 ft-lbs/in, or less than or equal to 6 ft-lbs/in. In other embodiments, the polyetherimides shave an unnotched Izod impact strength when determined according to ASTM D4812 at 23° C. from more than 5 to less than 25 ft-lbs/in, less than or equal to 24 ft-lbs/in, less than or equal to 23 ft-lbs/in, less than or equal to 22 ft-lbs/in, less than or equal to 21 ft-lbs/in, less than or equal to 20 ft-lbs/in, less than or equal to 19 ft-lbs/in, less than or equal to 18 ft-lbs/in, less than or equal to 17 ft-lbs/in, less than or equal to 16 ft-lbs/in, less than or equal to 15 ft-lbs/in, less than or equal to 14 ft-lbs/in, less than or equal to 13 ft-lbs/in, less than or equal to 12 ft-lbs/in, less than or equal to 11 ft-lbs/in, less than or equal to 10 ft-lbs/in, less than or equal to 9 ft-lbs/in, less than or equal to 8 ft-lbs/in, less than or equal to 7 ft-lbs/in, or less than or equal to 6 ft-lbs/in.

The polyimides can also have a glass transition temperature of greater than 180° C., specifically of 200° C. to 500° C., as measured using differential scanning calorimetry (DSC) per ASTM test D3418. In some embodiments the polyimide, an in particular a polyetherimide, has a glass transition temperature of 240° to 350° C.

In a further unexpected feature, the polyetherimides have reduced levels of residuals, in particular residual bis(halophthalimide) and residual bis(phthalimide). The presence of such residuals can reduce the Tg of the polyetherimide, reduce impact strength, reduce flow, or adversely affect other properties of the polyetherimides, such as colorlessness, or reduce the glossiness of an article made from the polyetherimide.

Thus, the polyetherimides can have a total content of residual bis(halophthalimide) and residual bis(phthalimide) of less than 0.05 wt %, less than 0.04 wt %, less than 0.03 wt %, less than 0.02 wt %, or less than 0.01 wt %, based on the total weight of the polyetherimide.

In addition, or in the alternative, the polyetherimides can have a total content of residual bis(halophthalimide) of less than 600 parts per million by weight (ppm), less than 500 ppm, less than 400 ppm, or less than 300 ppm, based on the total weight of the polyetherimide.

In addition, or in the alternative, the polyetherimides can have a content of chloride of less than 3000 ppm, less than 2500 ppm, less than 2000 ppm, or less than 1000 ppm, based on the total weight of the composition.

The polyetherimides can be formulated to provide a wide variety of polyetherimide compositions for the manufacture of articles. The polyetherimide compositions can further optionally comprise a filler, including a reinforcing filler, a particulate filler, a nanofiller, or a combination thereof. The filler can be a reinforcing filler, for example, a flat, plate-like, and/or fibrous filler. Typically, the flat, plate-like filler has a length and width at least ten times greater than its thickness, where the thickness is from 1 to 1000 micrometers. Exemplary reinforcing fillers of this type include glass flakes, mica, flaked silicon carbide, aluminum diboride, aluminum flakes, and steel flakes; wollastonite including surface-treated wollastonite; calcium carbonate including chalk, limestone, marble and synthetic, precipitated calcium carbonates, generally in the form of ground particulates; talc, including fibrous, modular, needle shaped, and lamellar talc; kaolin, including hard, soft, calcined kaolin, and kaolin comprising various coatings known in the art to facilitate compatibility with the polymeric matrix polymer; mica; and feldspar.

Exemplary reinforcing fillers also include fibrous fillers such as short inorganic fibers, natural mineral fibrous fillers, single crystal fibers, glass fibers, ceramic fibers and organic reinforcing fibrous fillers. Short inorganic fibers include borosilicate glass, carbon fibers, and those derived from blends comprising at least one of aluminum silicates, aluminum oxides, magnesium oxides, and calcium sulfate hemihydrate. Single crystal fibers or "whiskers" include silicon carbide, alumina, boron carbide, iron, nickel, and copper single crystal fibers. Glass fibers, including glass fibers such as E, ECR, S, and NE glasses and quartz and the like can also be used.

Such reinforcing fillers can be provided in the form of monofilament or multifilament fibers and can be used either alone or in combination with other types of fiber, through, for example, co-weaving or core/sheath, side-by-side, orange-type or matrix and fibril constructions, or by other methods known to one skilled in the art of fiber manufacture. Typical cowoven structures include glass fiber-carbon fiber, carbon fiber-aromatic polyimide (aramid) fiber, and aromatic polyimide fiber-glass fiber. Fibrous fillers can be supplied in the form of, for example, rovings, woven fibrous reinforcements, such as 0-90 degree fabrics, non-woven fibrous reinforcements such as continuous strand mat, chopped strand mat, tissues, papers and felts and 3-dimensionally woven reinforcements, performs and braids.

The reinforcing fibers can have a diameter of 5 to 25 micrometers, specifically diameters of 9 to 15 micrometers. In preparing molding compositions, it is convenient to use reinforcing fibers such as fiberglass in the form of chopped strands of from 3 millimeters to 15 millimeters long. In articles molded from these compositions, on the other hand, shorter lengths will typically be encountered because during compounding, considerable fragmentation can occur. Combinations of rigid fibrous fillers with flat, plate-like fillers can be used, for example, to reduce warp of a molded article.

In some applications it can be desirable to treat the surface of the filler with a chemical coupling agent to improve adhesion to a thermoplastic polymer in the composition. Examples of useful coupling agents are alkoxy silanes and alkoxy zirconates Amino, epoxy, amide, or thio functional alkoxy silanes are especially useful. Fiber coatings with high thermal stability are preferred to prevent decomposition of the coating, which could result in foaming or gas generation during processing at the high melt temperatures required to form the compositions into molded parts.

The amount of reinforcing filler used in the polyetherimide composition can vary widely, and is that amount effective to provide the desired physical properties and flame resistance. In some instances, the reinforcing filler is present in an amount from more than 10 to 60 wt %, more specifically 15 to 40 wt %, and even more specifically 20 to 35 wt %, each based on the total weight of the composition. In an embodiment no or substantially no reinforcing filler is present.

The polyetherimide composition can optionally comprise one or more other types of particulate fillers. Exemplary particulate fillers include silica, such as fused silica and crystalline silica; boron-nitride and boron-silicate; alumina, and magnesium oxide (or magnesia); silicate spheres; flue dust; cenospheres; aluminosilicate (armospheres); natural silica sand; quartz; quartzite; perlite; tripoli; diatomaceous earth; synthetic silica; and a combination thereof. All of the above fillers can be surface treated with silanes to improve adhesion and dispersion with the polymeric matrix polymer. When present, the amount of additional particulate filler in the polyetherimide composition can vary widely, and is that amount effective to provide the desired physical properties and flame resistance. In some instances the particulate filler is present in an amount from 1 to 80 wt %, specifically 5 to 30 wt %, more specifically 5 to 20 wt %, each based on the total weight of the composition. Alternatively, in some embodiments, our compositions do not contain appreciable amounts of fillers and in some situations, there are no detectable amounts of fillers, i.e., fillers are substantially absent or absent from the compositions. Accordingly, in some instances, the particulate filler is present in an amount from 0 wt % to an amount that is less than or equal to an amount selected from 80 wt %, 75 wt %, 70 wt %, 65 wt %, 60 wt %, 55 wt %, 50 wt %, 45 wt %, 40 wt %, 35 wt %, 30 wt %, 25 wt %, 20 wt %, 15 wt %, 10 wt %, 5 wt %, and 1 wt %, each based on the total weight of the composition.

Nanofillers can be added for a variety of purposes, and are characterized as having an average longest dimension of 0.5 to 100 nanometers. Nanofillers can be derived from any of the above materials for reinforcing or particulate fillers, for example, nanofillers comprising boehmite alumina (synthetic), calcium carbonate, ceramics, carbon black, carbon nanotubes, carbon fibers, cellulose, activated clay, natural clay (mined, refined, and treated), synthetic clay, organo-clays, natural fibers, gold, graphites, kaolins, magnesium hydroxide, mica, montmorillonite clay, polyorganosilsesqui-oxanes (POSS), silica, silver, talc, organotitanates, titania, wollastonite, zinc oxide, organozirconates, and zirconia. A combination of the foregoing can be used. In some instances the nano filler is present in an amount from 0.1 to 50 wt %, specifically 1 to 30 wt %, more specifically 1 to 20 wt %, each based on the total weight of the composition. Alternatively, in some embodiments, our compositions do not contain appreciable amounts of nanofillers and in some situations, there are no detectable amounts of fillers, i.e., fillers are substantially absent or absent from the compositions. Accordingly, in some instances, the nanofiller is present in an amount from 0 wt % to an amount that is less than or equal 50 wt %, 45 wt %, 40 wt %, 35 wt %, 30 wt %, 25 wt %, 20 wt %, 15 wt %, 10 wt %, 5 wt %, and 1 wt %, each based on the total weight of the composition.

The polyetherimide compositions can include various additives ordinarily incorporated into polymer compositions of this type, with the proviso that the additives are selected so as to not significantly adversely affect the desired properties of the composition. Exemplary additives include catalysts, impact modifiers, fillers, antioxidants, thermal stabilizers, light stabilizers, ultraviolet light (UV) absorbing additives, quenchers, plasticizers, lubricants, mold release agents, antistatic agents, visual effect additives such as dyes, pigments, and light effect additives, flame retardants, anti-drip agents, and radiation stabilizers. Combinations of additives can be used, for example, a combination of a heat stabilizer, a mold release agent, and optionally an ultraviolet light stabilizer. In general, the additives are used in the amounts generally known to be effective. The foregoing additives (except any fillers) are generally present in an amount from 0.005 to 20 wt %, specifically 0.01 to 10 wt %, based on the total weight of the composition. Alternatively, in some embodiments, our compositions do not contain appreciable amounts of additives, and in some situations, there are no detectable amounts of additives, i.e., additives are substantially absent or absent from the compositions. Accordingly, the foregoing additives (except any fillers) can be present in an amount from 0 to less than or equal to an amount selected from 20 wt %, 19 wt % 18 wt %, 17 wt %, 16 wt %, 15 wt %, 14 wt %, 13 wt %, 12 wt %, 11 wt %, 10 wt %, 9 wt %, 8 wt %, 7 wt %, 6 wt %, 5 wt %, 4 wt %, 3 wt %, 2 wt %, 1 wt %, and 0.0001 wt %, based on the total weight of the composition. In another embodiment, no appreciable amount of any additive other than a heat stabilizer, a mold release agent, and optionally an ultraviolet light stabilizer is present in the compositions. In still another embodiment, no detectable amount of any additive other than a heat stabilizer, a mold release agent, and optionally an ultraviolet light stabilizer is present in the compositions.

Suitable antioxidants can be compounds such as phosphites, phosphonites and hindered phenols or mixtures thereof. Phosphorus-containing stabilizers including triaryl phosphites and aryl phosphonates are useful additives. Difunctional phosphorus containing compounds can also be unseeded. Preferred stabilizers can have a molecular weight greater than or equal to 300. Some exemplary compounds are tris-di-tert-butylphenyl phosphite available from Ciba Chemical Co. as IRGAFOS 168 and bis(2,4-dicumylphenyl) pentaerythritol diphosphite available commercially from Dover Chemical Co. as DOVERPHOS S-9228.

Examples of phosphites and phosphonites include: triphenyl phosphite, diphenyl alkyl phosphites, phenyl dialkyl phosphites, tris(nonylphenyl)phosphite, trilauryl phosphite, trioctadecyl phosphite, distearyl pentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,6-di-tert-butyl-4-methylphenyl)-pentaerythritol diphosphite, diisodecyloxy pentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphite, tetrakis(2,4-di-tert-butyl-phenyl) 4,4'-biphenylene diphosphonite, bis(2,4-di-tert-butyl-6-methylphenyl) methyl phosphite, bis(2,4-di-tert-butyl-6-methylphenyl) ethyl phosphite, 2,2',2"-nitrilo[triethyl tris(3,3',5,5'-tetra-tert-butyl-1,1'-biphenyl-2,2'-diyl)phosphite], 2-ethylhexyl(3,3',5,5'-tetra-tert-butyl-1,1'-biphenyl-2,2'-diyl)phosphite and 5-butyl-5-ethyl-2-(2,4,6-tri-tert-butylphenoxy)-1,3,2-dioxaphosphirane.

Combinations comprising more than one organophosphorous compound are contemplated. When used in combination, the organo phosphorous compounds can be of the same type or different types. For example, a combination can comprise two phosphites or a combination can comprise a phosphite and a phosphonite. In some embodiments, phosphorus-containing stabilizers with a molecular weight greater than or equal to 300 are useful. Phosphorus-containing stabilizers, for example an aryl phosphite, are usually present in the composition in an amount from 0.005 to 3 wt %, specifically 0.01 to 1.0 wt %, based on total weight of the composition.

Hindered phenols can also be used as antioxidants, for example, alkylated monophenols, and alkylated bisphenols or poly phenols. Exemplary alkylated monophenols include 2,6-di-tert-butyl-4-methylphenol; 2-tert-butyl-4,6-dimethylphenol; 2,6-di-tert-butyl-4-ethylphenol; 2,6-di-tert-butyl-4-n-butylphenol; 2,6-di-tert-butyl-4-isobutylphenol; 2,6-dicyclopentyl-4-methylphenol; 2-(alpha-methylcyclohexyl)-4,6-dimethylphenol; 2,6-dioctadecyl-4-methylphenol; 2,4,6-tricyclohexylphenol; 2,6-di-tert-butyl-4-methoxymethylphenol; nonyl phenols which are linear or branched in the side chains, for example, 2,6-di-nonyl-4-methylphenol; 2,4-dimethyl-6-(1'-methylundec-1'-yl)phenol; 2,4-dimethyl-6-(1'-methylheptadec-1'-yl)phenol; 2,4-dimethyl-6-(1'-methyltridec-1'-yl)phenol and mixtures thereof. Exemplary alkylidene bisphenols include 2,2'-methylenebis(6-tert-butyl-4-methylphenol), 2,2'-methylenebis(6-tert-butyl-4-ethylphenol), 2,2'-methylenebis[4-methyl-6-(alpha-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(alpha-methylbenzyl)-4-nonylphenol], 2,2'-methylenebis[6-(alpha, alpha-dimethylbenzyl)-4-nonylphenol], 4,4'-methylenebis-(2,6-di-tert-butylphenol), 4,4'-methylenebis (6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis-(3,5-dimethyl-2-hydroxyphenyl)butane, 2,2-bis-(3,5-di-tert-butyl-4-hydroxyphenyl)propane, 2,2-bis-(5-tert-butyl-4-hydroxy-2-methylphenyl)-4-n-dodecylmercaptobutane, 1,1,5,5-tetra-(5-tert-butyl-4-hydroxy-2-methylphenyl)pentane and mixtures thereof.

The hindered phenol compound can have a molecular weight of greater than or equal to 300 g/mole. The high molecular weight can help retain the hindered phenol moiety in the polymer melt at high processing temperatures, for example, greater than or equal to 300° C. Hindered phenol stabilizers, are usually present in the composition in an amount from 0.005 to 2 wt %, specifically 0.01 to 1.0 wt %, based on total weight of the composition.

Examples of mold release agents include both aliphatic and aromatic carboxylic acids and their alkyl esters, for example, stearic acid, behenic acid, pentaerythritol tetrastearate, glycerin tristearate, and ethylene glycol distearate. Polyolefins such as high-density polyethylene, linear low-density polyethylene, low-density polyethylene, and similar polyolefin homopolymers and copolymers can also be used a mold release agents. Mold release agents are typically present in the composition at 0.05 to 10 wt %, based on total weight of the composition, specifically 0.1 to 5 wt %. Preferred mold release agents will have high molecular weight, typically greater than 300, to prevent loss of the release agent from the molten polymer mixture during melt processing.

In particular, an optional polyolefin can be added to modify the chemical resistance characteristics and mold release characteristics of the composition. Homopolymers such as polyethylene, polypropylene, polybutene can be used either separately or in combination. Polyethylene can be added as high-density polyethylene (HDPE), low-density polyethylene (LDPE), or a branched polyethylene. Polyolefins can also be used in copolymeric form with compounds containing carbonic acid radicals such as maleic acid or citric acid or their anhydrides, acid compounds containing acrylic acid radicals such as acrylic acid ester, and the like, as well as combinations comprising at least one of the foregoing. When present, the polyolefin, in particular HDPET, is used in an amount from more than 0 to 10 wt %, specifically 0.1 to 8 wt %, more specifically from 0.5 to 5 wt %, all based on the total weight of the composition.

In some embodiments, the polyetherimide compositions can further include at least one additional polymer. Examples of such additional polymers include and are not limited to PPSU (polyphenylene sulfone), polyetherimides, PSU (polysulfone), PPET (polyphenylene ether), PFA (perfluoroalkoxy alkane), MFA (co-polymer of TFE tetrafluoroethylene and PFVE perfluorinated vinyl ether), FEP (fluorinated ethylene propylene polymers), PPS (poly(phenylene sulfide), PTFE (polytetrafluoroethylene), PA (polyamide), PBI (polybenzimidizole) and PAI (poly(amide-imide)), poly (ether sulfone), poly(aryl sulfone), polyphenylenes, polybenzoxazoles, polybenzthiazoles, as well as blends and co-polymers thereof. When present, the polymer is used in an amount from more than 0 to 20 wt %, specifically 0.1 to 15 wt %, more specifically from 0.5 to 10 wt %, all based on the total weight of the composition. In an embodiment, no polymer other than the polyetherimide as described herein is present in the composition.

Colorants such as pigment and/or dye additives can also optionally be present. Useful pigments can include, for example, inorganic pigments such as metal oxides and mixed metal oxides such as zinc oxide, titanium dioxide, iron oxides, or the like; sulfides such as zinc sulfides, or the like; aluminates; sodium sulfo-silicates sulfates, chromates, or the like; carbon blacks; zinc ferrites; ultramarine blue; organic pigments such as azos, di-azos, quinacridones, perylenes, naphthalene tetracarboxylic acids, flavanthrones, isoindolinones, tetrachloroisoindolinones, anthraquinones, enthrones, dioxazines, phthalocyanines, and azo lakes; Pigment Red 101, Pigment Red 122, Pigment Red 149, Pigment Red 177, Pigment Red 179, Pigment Red 202, Pigment Violet 29, Pigment Blue 15, Pigment Blue 60, Pigment Green 7, Pigment Yellow 119, Pigment Yellow 147, Pigment Yellow 150, and Pigment Brown 24; or combinations comprising at least one of the foregoing pigments. Pigments are generally used in amount from 0 to 10 wt %, specifically 0 to 5 wt %, based on the total weight of the composition. In some instances, where improved impact is desired, pigments such as titanium dioxide will have a mean particle size of less than 5 microns.

The polyetherimide compositions can also optionally include a fluoropolymer in an effective amount to provide anti-drip or other beneficial properties to the polymer composition. In one instance, the fluoropolymer is present in an amount 0.01 to 5.0 wt % of the composition. Examples of suitable fluoropolymers and methods for making such fluoropolymers are set forth, for example, in U.S. Pat. Nos. 3,671,487, 3,723,373, and 3,383,092. Suitable fluoropolymers include homopolymers and copolymers that comprise structural units derived from one or more fluorinated alpha-olefin monomers, for example, $CF_2\!\!=\!\!CF_2$, $CHF\!\!=\!\!CF_2$, $CH_2\!\!=\!\!CF_2$ and $CH_2\!\!=\!\!CHF$ and fluoro propylenes such as, for example, $CF_3CF\!\!=\!\!CF_2$, $CF_3CF\!\!=\!\!CHF$, $CF_3CH\!\!=\!\!CF_2$, $CF_3CH\!\!=\!\!CH_2$, $CF_3CF\!\!=\!\!CHF$, $CHF_2CH\!\!=\!\!CHF$, and $CF_3CF\!\!=\!\!CH_2$.

Copolymers comprising structural units derived from two or more fluorinated alpha-olefin monomers can also be used, for example, poly(tetrafluoroethylene-hexafluoroethylene), as well as copolymers comprising structural units derived from one or more fluorinated monomers and one or more non-fluorinated monoethylenically unsaturated monomers that are copolymerizable with the fluorinated monomers such as poly(tetrafluoroethylene-ethylene-propylene) copolymers. Suitable non-fluorinated monoethylenically unsaturated monomers include for example, alpha-olefin monomers such as ethylene, propylene, butene, acrylate monomers such as, methyl methacrylate, butyl acrylate, and the like, with poly(tetrafluoroethylene) homopolymer (PTFE) preferred.

The fluoropolymer can be pre-blended in some manner with a polymer such as an aromatic polycarbonate or polyimide polymer. For example, an aqueous dispersion of fluoropolymer and a polycarbonate polymer can be steam precipitated to form a fluoropolymer concentrate for use as a drip inhibitor additive in thermoplastic polymer compositions, as disclosed, for example, in U.S. Pat. No. 5,521,230. Alternatively, the fluoropolymer can be encapsulated.

In some instances it is desired to have polyetherimide compositions that are essentially free of bromine and chlorine. "Essentially free" of bromine and chlorine means that the composition has less than 3 wt % of bromine and chlorine, and in other embodiments, less than 1 wt % bromine and chlorine by weight of the composition. In other embodiments, the composition is halogen free. "Halogen free" is defined as having a halogen content (total amount of fluorine, bromine, chlorine and iodine) of less than or equal to 1000 parts by weight of halogen ppm by weight of the total composition. The amount of halogen can be determined by ordinary chemical analysis such as atomic absorption.

The polyetherimide compositions can be prepared by blending the ingredients under conditions for the formation of an intimate blend. Such conditions often include melt mixing in single or twin screw type extruders, mixing bowl, or similar mixing devices that can apply a shear to the components. Twin-screw extruders are often preferred due to their more intensive mixing capability and self-wiping capability, over single screw extruders. It is often advantageous to apply a vacuum to the blend through at least one vent port in the extruder to remove volatile impurities in the composition.

The polymer blend can also be melt filtered using a 40 to 100 micron candle or screen filter to remove undesirable black specks or other heterogeneous contaminants.

In an exemplary process, the various components are placed into an extrusion compounder to produce a continuous strand that is cooled and then chopped into pellets. In another procedure, the components are mixed by dry blending, and then fluxed on a mill and comminuted, or extruded and chopped. The composition and any optional components can also be mixed and directly molded, e.g., by injection or transfer molding techniques. Preferably, all of the components are freed from as much water as possible. In addition, compounding is carried out to ensure that the residence time in the machine is short; the temperature is carefully controlled; the friction heat is utilized; and an intimate blend between the components is obtained.

The polyetherimide compositions can then be molded in any equipment conventionally used for thermoplastic compositions. The polyetherimide compositions can be formed into articles by any number of methods, for example, shaping, foaming, extruding (including profile extrusion), thermoforming, spinning, or molding, including injection molding, compression molding, gas assist molding, structural foam molding, and blow molding. In an embodiment, a method of forming an article comprises shaping, extruding, blow molding, or injection molding the composition to form the article. Polyetherimide compositions can also be formed into articles using thermoplastic processes such as film and sheet extrusion, for example, melt casting, blown film extrusion, and calendaring. Co-extrusion and lamination processes can be used to form composite multi-layer films or sheets. When spun into fibers, the fibers can be woven or entangled to provide a fabric, for example, a woven cloth or a felt.

Because the polyetherimide compositions have a combination of useful properties, they are useful in many applications. The excellent melt flow is especially useful for the manufacture of molded articles having a thickness form 1 to 5 millimeters. Thus, in some embodiments, an article comprises the polyetherimide composition. Examples of applications for the articles include food service, medical, lighting, lenses, sight glasses, windows, enclosures, safety shields, and the like. The high melt flow allows the composition to be molded into intricate parts with complex shapes and/or thin sections and long flow lengths. Examples of other articles include, but are not limited to, cookware, medical devices, trays, plates, handles, helmets, animal cages, electrical connectors, enclosures for electrical equipment, engine parts, automotive engine parts, lighting sockets and reflectors, electric motor parts, power distribution equipment, communication equipment, computers, and the like, including devices that have molded in snap fit connectors. The polyetherimide compositions can also be made into film and sheets as well as components of laminate systems. The sheet can be a foam sheet, paper sheet, or fabric sheet. Articles include, for example, hollow fibers, hollow tubes, fibers, sheets, films, multilayer sheets, multilayer films, molded parts, extruded profiles, coated parts, foams, windows, luggage racks, wall panels, chair parts, lighting panels, diffusers, shades, partitions, lenses, skylights, lighting devices, reflectors, ductwork, cable trays, conduits, pipes, cable ties, wire coatings, electrical connectors, air handling devices, ventilators, louvers, insulation, bins, storage containers, doors, hinges, handles, sinks, mirror housing, mirrors, toilet seats, hangers, coat hooks, shelving, ladders, hand rails, steps, carts, trays, cookware, food service equipment, communications equipment and instrument panels.

In other embodiments, the polyetherimides can be used as additives in polymer systems as well as used as toughening agent. Examples of such additional uses include and are not limited to epoxies, varnishes, powder coatings, and composites. A varnish, for example, can comprise the polyetherimide composition and a solvent, for example, water, turpentine, white spirit, or mineral spirits, among others. Other varnish components can be present, for example, a drying oil (such as linseed oil, tong oil, or walnut oil), a resin (such as an epoxy, acrylic, alkyd, or polyurethane), and additives known in the art. Powder compositions for forming a powder coating can comprise the polyetherimide composition and the coating powder, which generally includes the particulate resin binder (e.g., an epoxy, polyurethane, silicone, silane, or the like) and other additives such as hardeners, accelerators, fillers, and colorants.

In an embodiment, the polyetherimide is exposed to a temperature of 770° F. (410° C.). In another embodiment, the polyetherimide exhibits a reduction of viscosity ranging from 35%. In another embodiment, the 3-substituted phthalic anhydride and the sulfone diamine converts to the bis(phthalimide) in a conversion of at least 99.5%.

In another embodiment, the polyetherimide has a glass transition temperature, Tg, that is at least 260° C. In another embodiment, the polyetherimide retains a melt stability of at least 95% when the polyetherimide resin is exposed to a temperature of 775° F. (410° C.) for 9 minutes.

In another embodiment, the catalyst is present in an amount ranging from 0.05 to 1 mole % based on the moles of the sulfone diamine during the imidization, and a second catalyst is added before the polymerization, wherein the second catalyst is selected from quaternary ammonium salts, guanidinium salts, pyridinium salts, imidazolium salts, and combinations thereof, and wherein the second catalyst is the same or different from the catalyst for the imidization. In another embodiment, catalyst is hexaethylguanidinium chloride. In another embodiment, the 3,3'-bis(phthalimide) composition and the polyetherimide composition are manufactured in the same vessel.

In a further embodiment, the catalysts are a guanidinium salt, and the polyetherimide composition comprises less than 1000 ppm of the residue of the catalyst, based on the weight of the polyetherimide. In another embodiment, the polyetherimide comprises less than 100 ppm by weight of a sodium aryl phosphinate salt, based on the weight of the polyetherimide. In another embodiment, the polyetherimide comprises no detectable amount of the sodium aryl phosphinate salt.

In another embodiment, the polyetherimide further comprises an additive selected from an antioxidant, a UV absorber, a mold release agent, and combinations thereof.

In another embodiment, the article is selected from a sheet, film, multilayer sheet, multilayer film, molded part, extruded shape, molded shape, coated part, pellet, powder, foam, fiber, fibrid, flaked fiber, and combinations thereof.

In another embodiment, the article is selected from an extruded sheet, extruded film, extruded fiber, and extruded stockshape. In another embodiment, the article is a molded part. In another embodiment, the molded part is an injection molded part.

In another embodiment, the article is a sheet or film and further comprises a conductive metal layer disposed on a side thereof. In another embodiment, the article is an optical lens.

In another embodiment, the article is an optical fiber connector, an electrical connector, an LED reflector, a printed circuit board substrate, or a reflector for automotive headlamp.

In another embodiment, a method of forming an article, comprises shaping, extruding, blow molding, or injection molding the polyetherimide composition to form the article. In another embodiment, an article comprises the polyetherimide manufactured by the method disclosed above.

Without further elaboration, it is believed that one skilled in the art can, using the description herein, utilize the present invention. The following examples are included to provide additional guidance to those skilled in the art of practicing the claims. Accordingly, these examples are not intended to limit the invention in any manner.

EXAMPLES

Materials used in the Examples are listed Table 1. Amounts listed in the Examples are in weight percent (wt %), based on the total weight of the composition.

TABLE 1

Materials

| Polymer | Tg*** (° C.) | Isomer | Process | Imidization catalyst | Polymerization catalyst |
|---|---|---|---|---|---|
| PEI-1 Invention ("non-SPP")* Polyetherimide sulfone (EXTEM XH1015 non-SPP) | 267 | 3,3'- | Chloro-displacement | HEG-Cl | HEG-Cl |
| PEI-2 Comparative ("SPP")* Polyetherimide sulfone (EXTEM XH1015 SPP) | 267 | 3,3'- | Chloro-displacement | SPP | HEG-Cl |
| PEI-3 ("non-SPP")** Polyetherimide sulfone (Ultem VH 1003 non-SPP) | 247 | 4,4'- | Chloro-displacement | HEG-Cl | HEG-Cl |
| PEI-4 ("SPP") Polyetherimide sulfone** (Ultem VH 1003 SPP) | 247 | 4,4'- | Chloro-displacement | SPP | HEG-Cl |
| PEI-5 ("Non-SPP")** Polyetherimide sulfone (Ultem VH 1003 non-SPP) | 247 | 4,4'- | Condensation | — | HEG-Cl |
| PEI-6 ("non-SPP") Polyetherimide sulfone** (Ultem VH 1003 SPP) | 247 | 4,4'- | Condensation | — | SPP |

*Derived from 2,2'-(sulfonylbis(4,1-phenylene))bis(4-chloroisoindoline-1,3-dione) and bisphenol A
**Derived from Bisphenol-A dianhydride (BPADA) and diamino diphenyl sulfone (DDS)
***Theoretical In Table 1, the polymers were synthesized by the chloro-displacement or condensation method as indicated, in the presence or absence of SPP and HEG-Cl as indicated. The notation "3,3'-" and "4,4'-" means that in the PEI formula

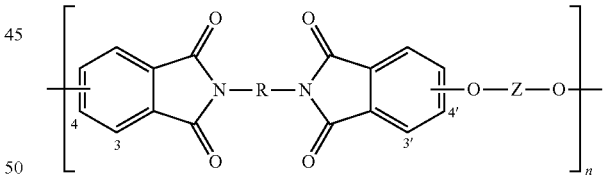

the divalent bonds between the —O—Z—O— group and the phenyl substituents are predominantly in the 3,3', or 4,4' positions, respectively. In the polyetherimides in Table 1, Z is 2,2-phenyleneisopropylidene, and $RN_2$ is m-phenylene diamine (mPD). In the polyetherimide sulfones in Table 1, Z is 2,2-phenyleneisopropylidene, and $RN_2$ is 4-4'-diaminodiphenyl sulfone.

Techniques/Procedures

Gel Permeation Chromatography (GPC) Testing Procedure

The GPC samples were prepared by dissolving 5-10 milligrams (mg) of a sample in 10 milliliters (mL) of dichloromethane. Three to five drops of the polymer solution were added to a 10 mL dichloromethane solution with acetic acid (1-2 drops). The sample solution was then filtered and injected. The analysis was performed by referencing the polymer peak to the oDCB peak. The GPC instrument was a Waters 2695 separations module, which was calibrated with polystyrene standards from Aldrich Chemical Company.

Rheology Procedure

The oscillatory time sweeps measurement was used to determine the thermal stability of a material (monitoring the change in viscosity or modulus of a material as a function of time) at a constant temperature. Oscillatory measurements were performed using a 25 mm parallel-plate geometry at a 15% strain (linear viscoelastic regime) with a fixed gap of 1 mm using an ARES Strain Controlled Rheometer Manufactured by TA Instruments. The test frequency was fixed at 10 rad/s.

Abusive Molding Procedure

Three temperatures and three residence times were tested with a 180 ton-force (1800 kN) injection molding machine, Extra 180-430, from DMAG Plastics Group.

MVR Procedure

MVR was tested according to ASTM 1238. The load applied was 6.7 kg.

Melt Loss

Flexural properties were tested according to ASTM D790 on 127×12.7×3.2 mm bars.

Tensile properties were tested according to ASTM D638 on 165×12.7×3.2 mm (length×width×thickness) injection molded bars at 23° C. with a crosshead speed of 5 mm/min.

Un-notched Izod testing was done on 3×½×⅛ inch (76.2× 12.7×3 2 mm) bars using ASTM D256. Samples were tested at room temperature. The pendulum energy was 5 lb/ft.

Example 1

This example compares various properties of two 3,3'-isomer polyetherimide sulfone polymers polymerized via the chloro-displacement method using two different catalysts in the imidization step, non-SPP (PEI-1) and SPP (PEI-2).

TABLE 2

GPC results before and after 30 minute time sweeps at 385° C.

| Catalyst Testing | Temp (° C.) | Mw | Mn | Mw increase | % Elastic Modulus Increase | Onset Time of instability |
|---|---|---|---|---|---|---|
| non-SPP (PEI-1) Before time dwell | 385 | 51746 | 15080 | — | — | — |
| non-SPP (PEI-1) After time dwell | 385 | 61195 | 16267 | 18% | 15 | 18 mins |
| SPP (PEI-2) Before time dwell | 385 | 51333 | 15119 | — | — | — |
| SPP (PEI-2) After time dwell | 385 | 67486 | 16460 | 31% | 57 | 6 mins |

For example, as can be seen from Tables 2 and 3, for the non-SPP polyetherimide, PEI-1 (imidized with HEG-Cl), when tested at 385° C., the onset of the increase in elastic modulus (indicative of a change in the material, such as crosslinking or loss of stability) began at approximately 18 minutes, whereas for PEI-2, imidized with the SPP catalyst, the onset began at 6 minutes. Therefore, the non-SPP PEI-1 was thermally stable for three times the duration at 385° C. compared to the polymer imidized with SPP catalyst. The above result is also confirmed by the GPC/SEC measurements.

TABLE 3

GPC results before and after 30 minute time sweeps at 400° C.

| Polymer (catalyst) | Temp (° C.) | Mw | Mn | Mw increase | % Elastic Modulus Increase | Onset Time of instability |
|---|---|---|---|---|---|---|
| PEI-2 (HEG-Cl) Before time dwell | 400 | 51746 | 15080 | — | — | — |
| PEI-2 (HEG-Cl) After time dwell | 400 | 69172 | 16769 | 33% | 53 | 15 mins |
| PEI-1 (SPP) Before time dwell | 400 | 51333 | 15119 | — | — | — |
| PEI-1 (SPP) After time dwell | 400 | 74300 | 16316 | 45% | 136 | 3 mins |

The melt stability difference between the two polymers is more pronounced at more elevated temperature. Both non-SPP PEI-1 polymer and SPP PEI-2 polymer were stable for more than 10 minutes at 385° C. represented by a 0 to negative melt viscosity change. When the non-SPP PEI-1 (imidized with HEG-Cl) was tested at 400° C., the onset of increase in viscosity (indicative of a change in the material, such as crosslinking or loss of stability) began at after 15 minutes, whereas the PEI-2 polymerized with SPP became unstable after a much shorter exposure to 400° C. and 410° C. (approximately 3 minutes).

Abusive molding testing was performed to evaluate the performance of the polymers at extreme molding conditions. Complete parts (tensile and Izod bars) were obtained using both non-SPP (PEI-1) and SPP (PEI-1) polymers at all molding temperatures (393° C., 402° C., and 413° C.) when the molding residence time was 2.5 minutes. However, at 413° C. the SPP polymer melt became too unstable to mold any part when the residence time was 5 minutes or longer. Izod parts were molded successfully with the non-SPP PEI-1 polymer at all molding conditions and at all three temperatures. At 7.5 min, however, the non-SPP PEI-1 polymer failed to achieve complete tensile bars as the parts were too brittle to sustain the ejection pressure. The results of the abusive molding are summarized in Table 4.

TABLE 4

| | | | | | Parts molded | |
|---|---|---|---|---|---|---|
| Run | Temp (° C.) | Time Min | Cool Time Sec | Cycle Time sec | SPP (PEI-1) | HEG-Cl (Non-SPP, PEI-2) |
| 1 | 393 | 2.5 | 17 | 33 | Tensile, Izod | Tensile, Izod |
| 2 | 393 | 5 | 52 | 68 | Tensile, Izod | Tensile, Izod |
| 3 | 393 | 7.5 | 77 | 93 | Tensile, Izod | Tensile, Izod |
| 4 | 402 | 2.5 | 17 | 33 | Tensile, Izod | Tensile, Izod |
| 5 | 402 | 5 | 52 | 68 | Tensile, Izod | Tensile, Izod |
| 6 | 402 | 7.5 | 77 | 93 | Tensile, Izod | Tensile, Izod |
| 7 | 413 | 2.5 | 17 | 33 | Tensile, Izod | Tensile, Izod |
| 8 | 413 | 5 | 52 | 68 | None | Izod |
| 9 | 413 | 7.5 | 77 | 93 | None | Izod |

Figure 4A:
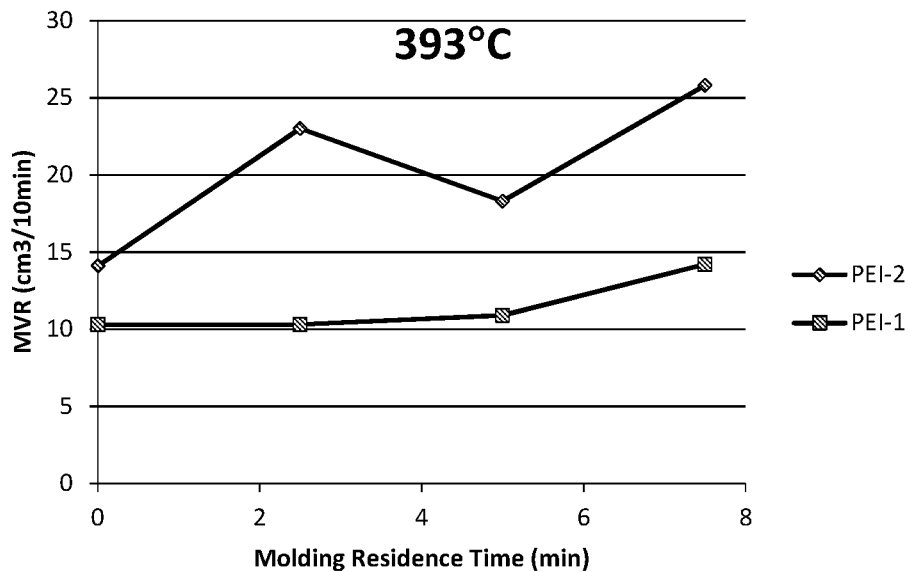
FIGS. 4a, 4b, and 4c show graphs showing the effect of molding residence time on the resulting MVR of PEI-1 and PEI-2 parts at different molding temperatures.
Figure 4B:
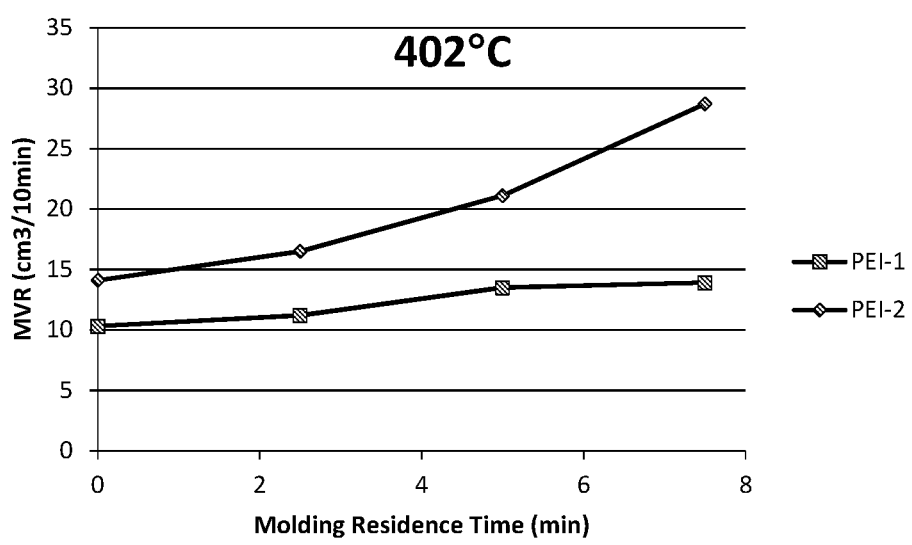
Figure 4C:
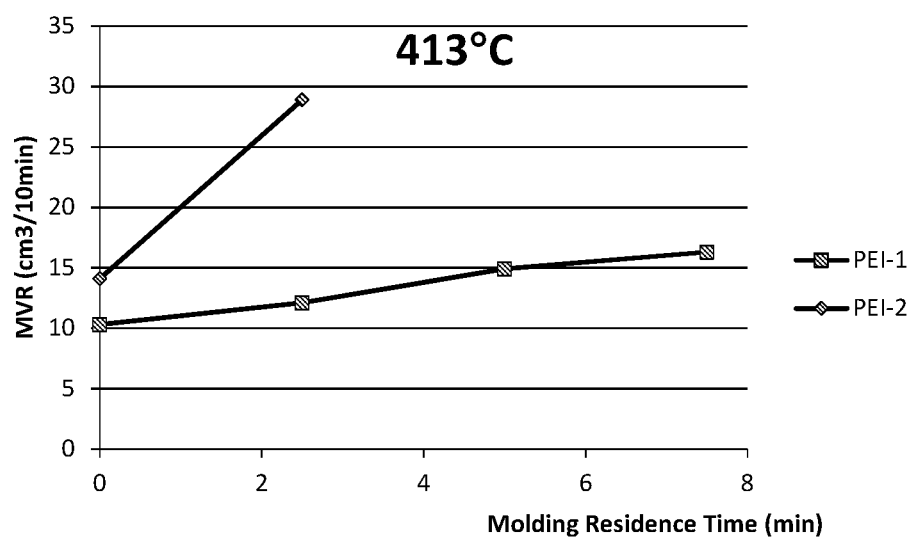

The injection molded parts were ground and the MVR was tested. The results are shown in FIG. 4. A larger MVR increase was observed in the SPP polymer (PEI-2) at all three temperatures when the residence time increases, indicating that increased degradation occurred in the injection molding relative to the non-SPP polymer (PEI-1).

Figure 5A:
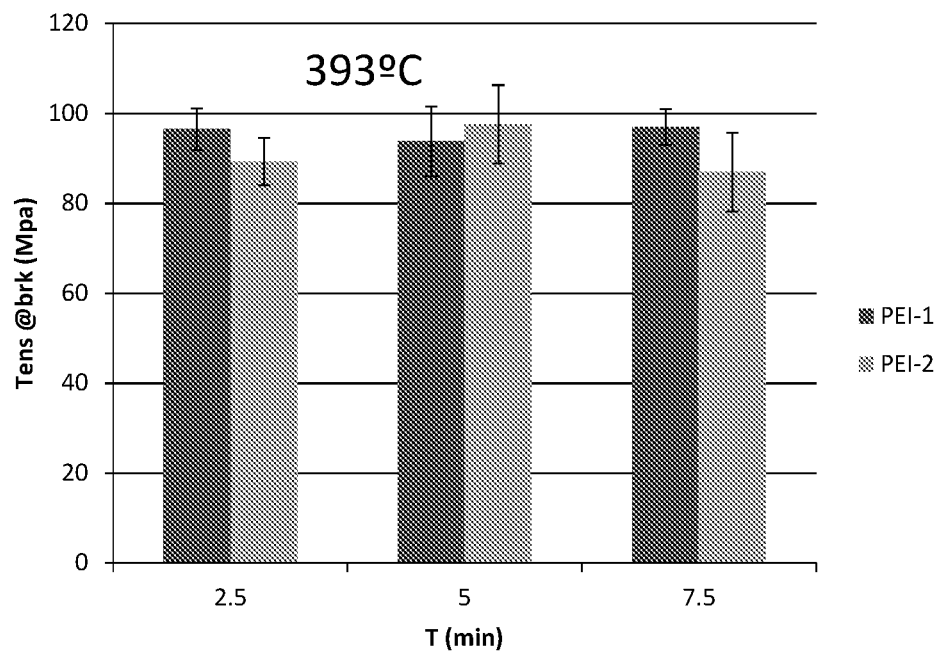
FIGS. 5a, 5b, and 5c show graphs showing the effect of molding residence time on the tensile strength at break of the resulting PEI-1 and PEI-2 parts at different molding temperatures.
Figure 5B:
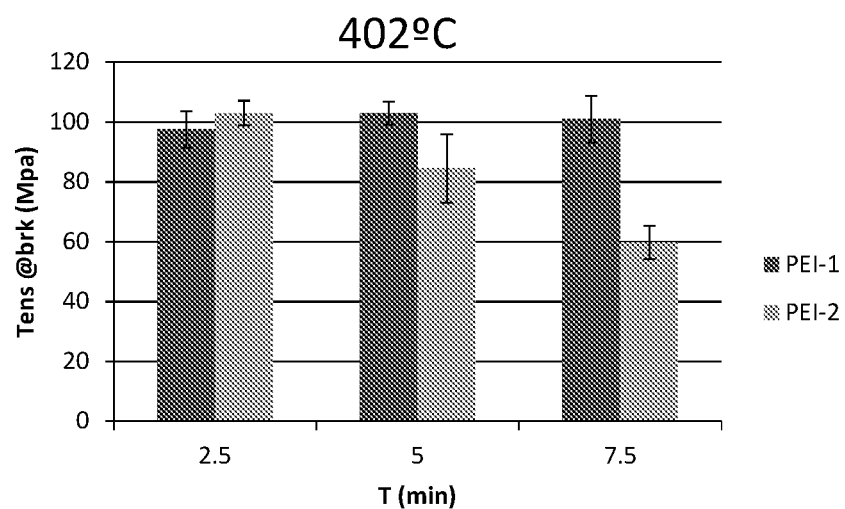
Figure 5C:
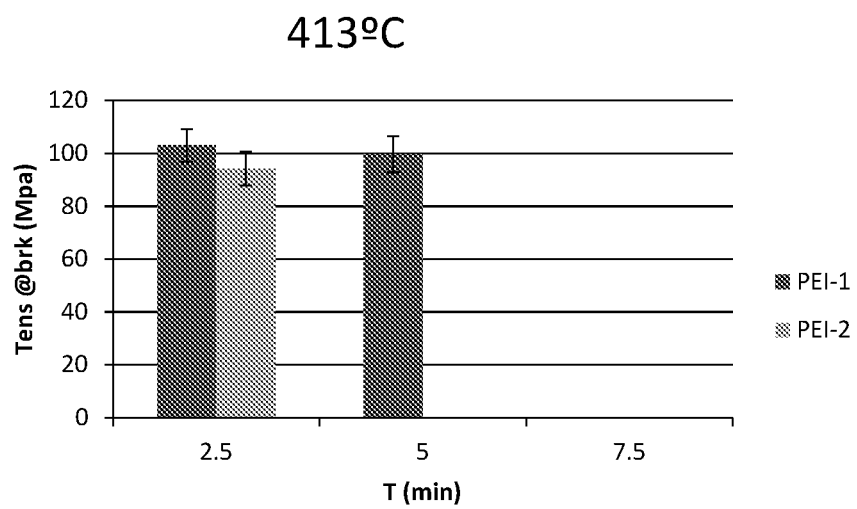
Figure 6A:
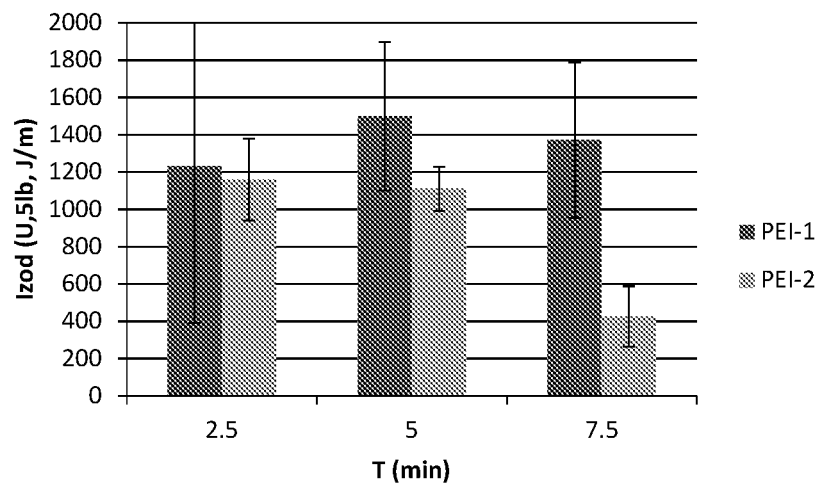
FIGS. 6a, 6b, and 6c show graphs showing the effect of molding residence time on the unnotched Izod of the resulting PEI-1 and PEI-2 parts at different molding temperatures.
Figure 6B:
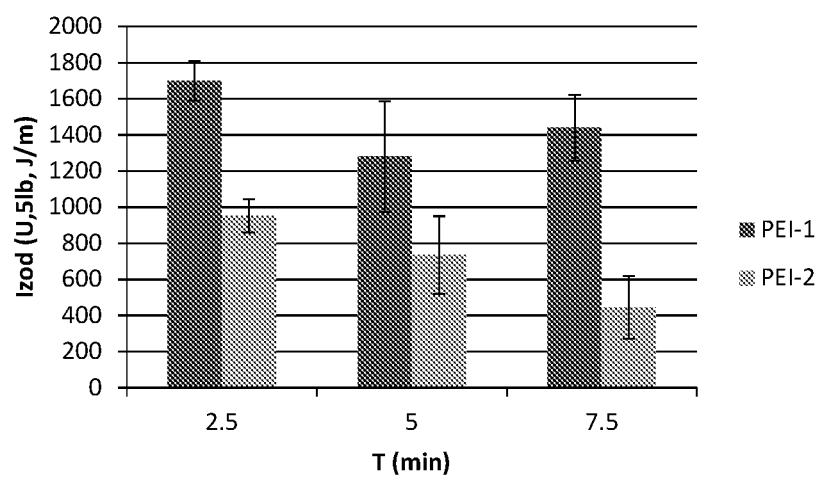
Figure 6C:
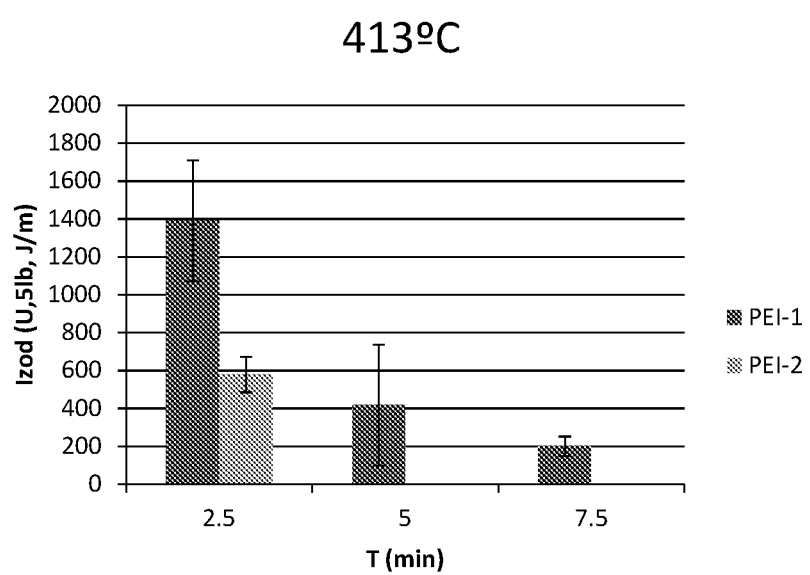
Figure 7A:
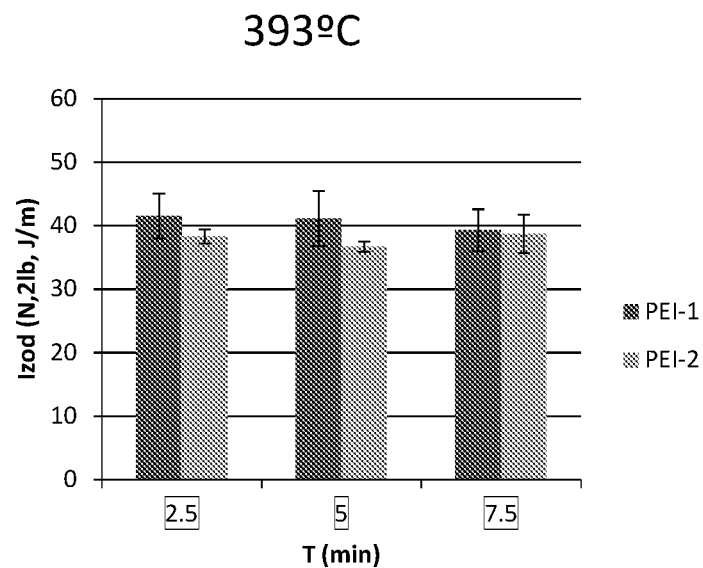
FIGS. 7a, 7b, and 7c show graphs showing the effect of residence time on the notched Izod of PEI-1 and PEI-2 at different molding temperatures.
Figure 7B:
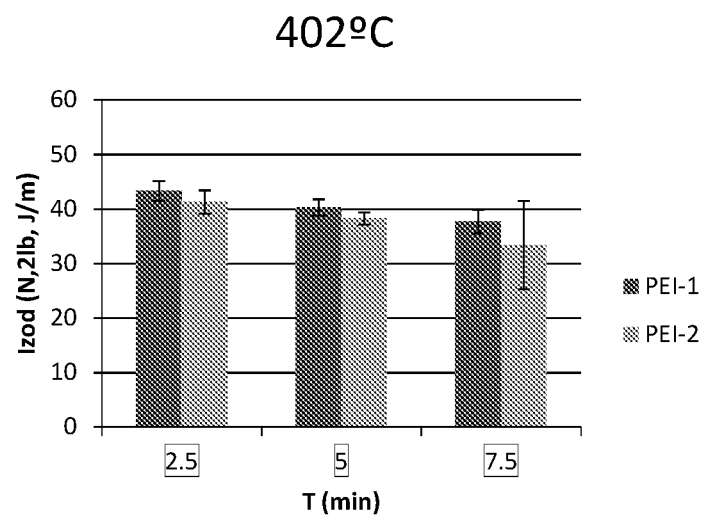
Figure 7C:
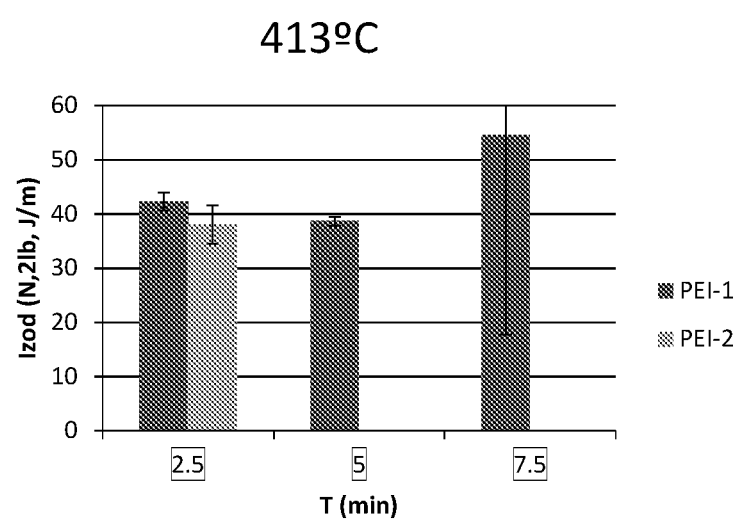
Figure 8A:
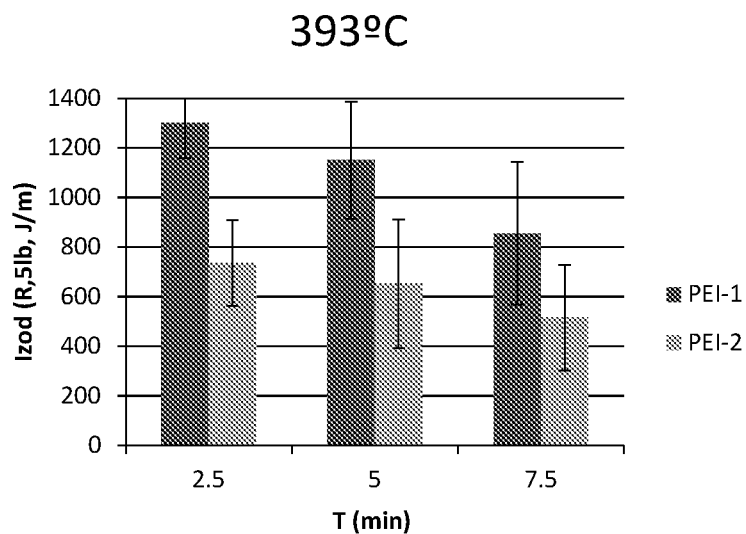
FIGS. 8a, 8b, and 8c show graphs showing the effect of residence time on the reverse unnotched Izod of the resulting PEI-1 and PEI-2 parts at different residence temperatures.
Figure 8B:
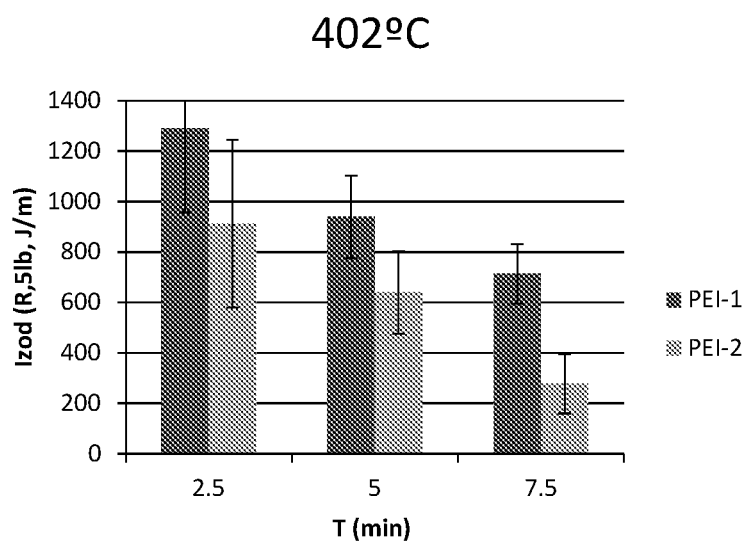
Figure 8C:
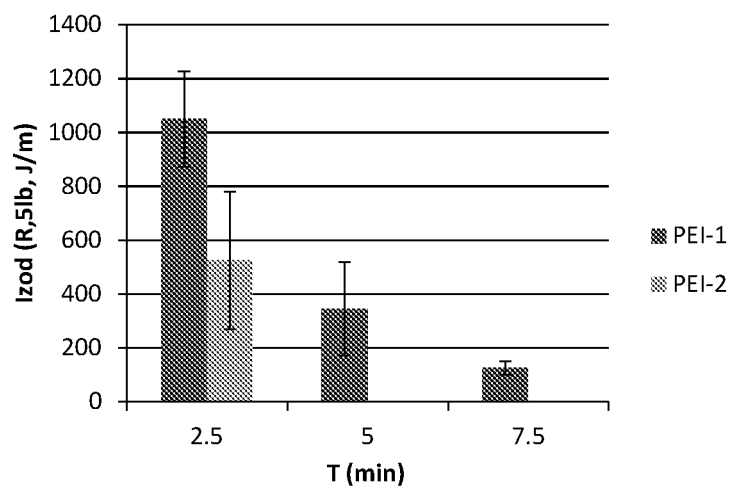

The physical properties of the molded parts were also measured. The reduction in properties of the SPP polymer (PEI-2) as a function of residence time was more noticeable at elevated molding temperatures compared to the non-SPP polymer (PEI-1), especially in tensile properties (FIG. 5), unnotched Izod properties (FIG. 6), notched Izod properties (FIG. 7), and reverse unnotched Izod Properties (FIG. 8). The tensile retention of the SPP polymer decreased as the residence time increased at 402° C. The non-SPP polymer was able to maintain its tensile strength up to 5 minutes residence time at 413° C. The trend observed in the unnotched Izod impact data was consistent with the tensile strength data except that it was more sensitive to residence time, especially 7.5 min at 402° C. and 413° C., where the non-SPP polymer outperformed the SPP polymer. These results are also consistent with the melt stability data discussed above.

Example 2 (Comparative)

This example compares various properties of two 4,4'-isomer polyetherimide sulfone polymers polymerized via the chloro displacement method using two different catalysts, HEG-Cl (non-SPP PEI-3) and SPP (PEI-4).

Figure 2A:
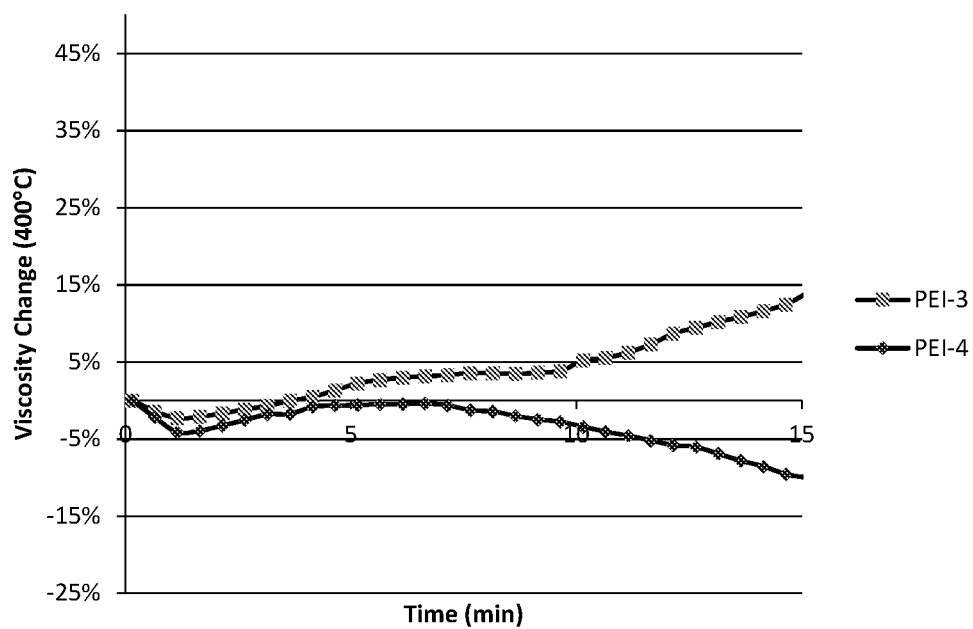
FIGS. 2a and 2b show graphs showing the dynamic oscillatory rheology curves of two 4,4'-isomer polyetherimide sulfone polymers polymerized via the chloro-displacement method using two different catalysts (HEG-Cl (PEI-3) and SPP (PEI-4)) in the imidization step at (a) 400° C. and (b) 410° C.
Figure 2B:
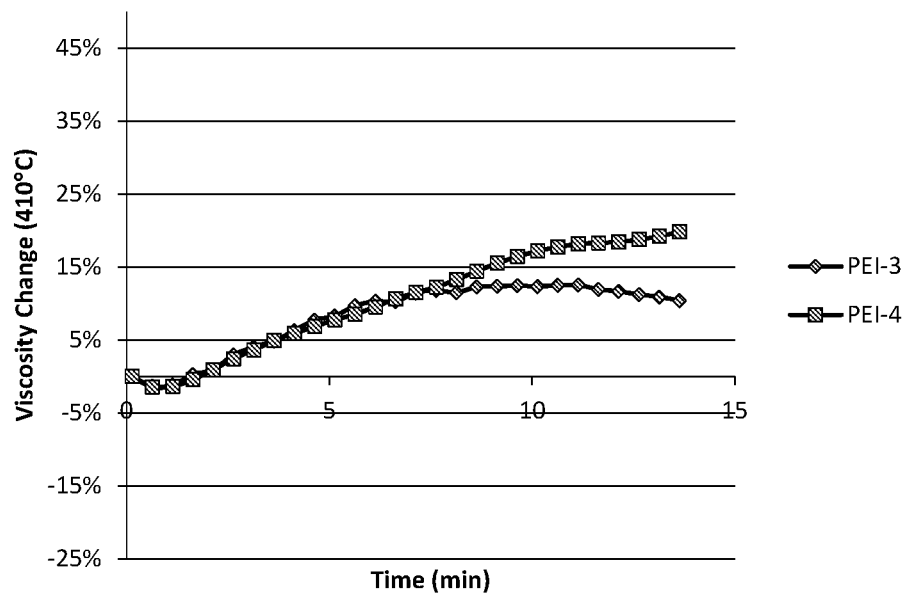

From FIG. 2a, it can be seen that the amount of increased viscosity (instability) at 400° C. for non SPP PEI-3 is actually greater than non-SPP PEI-4, which is the opposite from non SPP PEI-1 and SPP PEI-2. In fact, PEI-4 showed better melt stability compared to PEI-3. At 410° C., both PEI-3 and PEI-4 are unstable after 3 mins indicated by the steady increase of melt viscosity.

Example 3 (Comparative)

This example compares various properties of two 4,4'-isomer polyetherimide sulfone polymers polymerized via the condensation method using two different catalysts, HEG-Cl (non SPP PEI-5) and SPP (PEI-6).

Figure 3A:
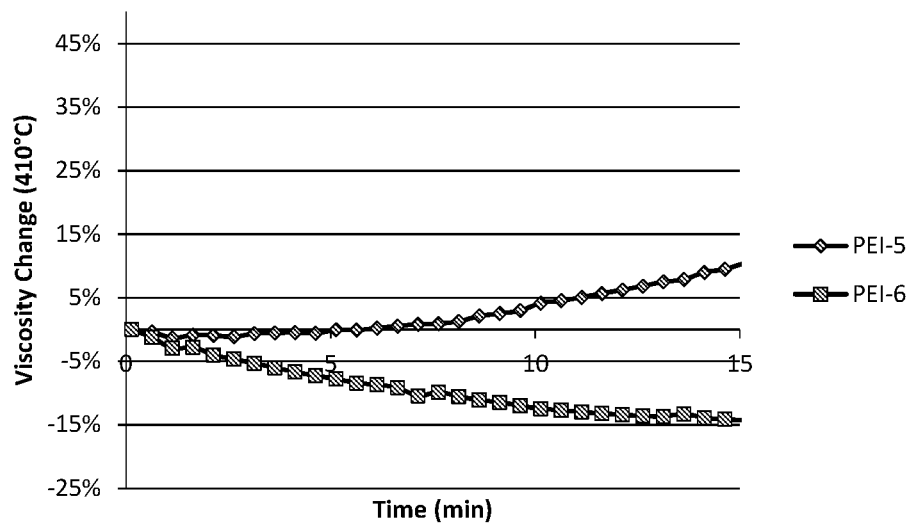
FIGS. 3a and 3b show graphs showing the dynamic oscillatory rheology curves of two 4,4'-isomer polyetherimide sulfone polymers polymerized via the condensation method using two different catalysts (HEG-Cl (PEI-5) and SPP (PEI-6)) in the imidization step at (a) 400° C. and (b) 410° C.
Figure 3B:
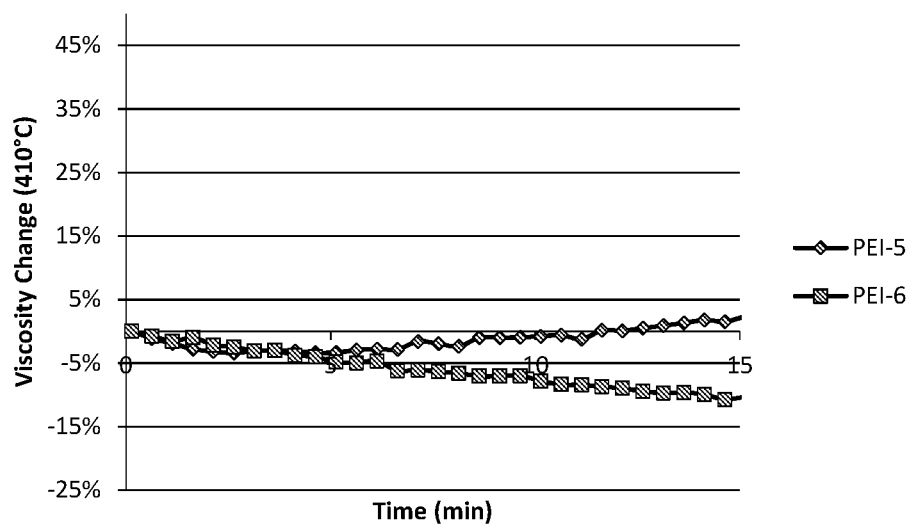

From FIG. 3, it can be seen that the amount of increased viscosity (instability) at 400° C. is not as pronounced between PEI-5 (non-SPP) and PEI-6 (SPP) for the 4,4'-isomer polymers, compared to the 3,3'-isomer polymers. In fact, PEI-6 showed a slightly improved melt stability compared to PEI-5.

Abusive molding was also performed using these polymers. Parts for tensile, flex and Izod testing were successfully molded at all molding conditions with both PEI-5 (non SPP) and PEI-6 (SPP) polymers as shown in Table 5.

TABLE 5

| Run | Temp deg C. | Time Min | Cool Time Sec | Cycle Time Sec | Parts molded SPP, PEI-6 | Non SPP PEI-5 |
|---|---|---|---|---|---|---|
| 1 | 393 | 2.5 | 17 | 33 | Tensile, flex, Izod | Tensile, flex, Izod |
| 2 | 393 | 5 | 52 | 68 | Tensile, flex, Izod | Tensile, flex, Izod |
| 3 | 393 | 7.5 | 77 | 93 | Tensile, flex, Izod | Tensile, flex, Izod |
| 4 | 402 | 2.5 | 17 | 33 | Tensile, flex, Izod | Tensile, flex, Izod |
| 5 | 402 | 5 | 52 | 68 | Tensile, flex, Izod | Tensile, flex, Izod |
| 6 | 402 | 7.5 | 77 | 93 | Tensile, flex, Izod | Tensile, flex, Izod |
| 7 | 413 | 2.5 | 17 | 33 | Tensile, flex, Izod | Tensile, flex, Izod |
| 8 | 413 | 5 | 52 | 68 | Tensile, flex, Izod | flex, Izod |
| 9 | 413 | 7.5 | 77 | 93 | Tensile, flex, Izod | flex, Izod |

Figure 9A:
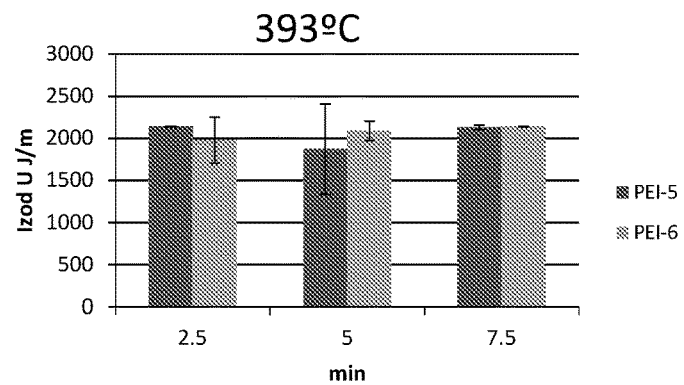
FIGS. 9a, 9b, and 9c show graphs showing the effect of residence time on the unnotched Izod at of the resulting PEI-5 and PEI-6 at different residence temperatures.
Figure 9B:
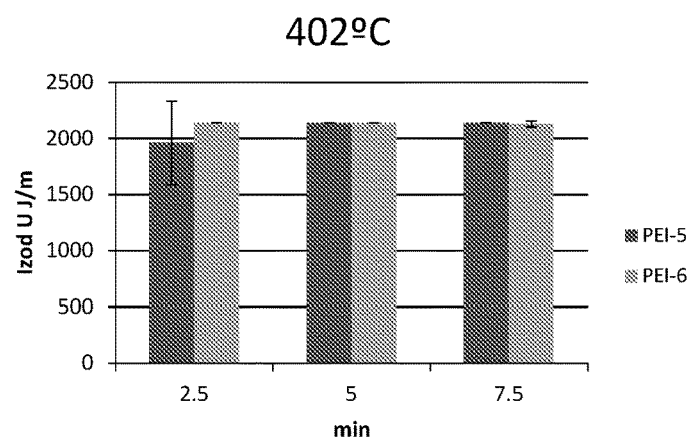
Figure 9C:
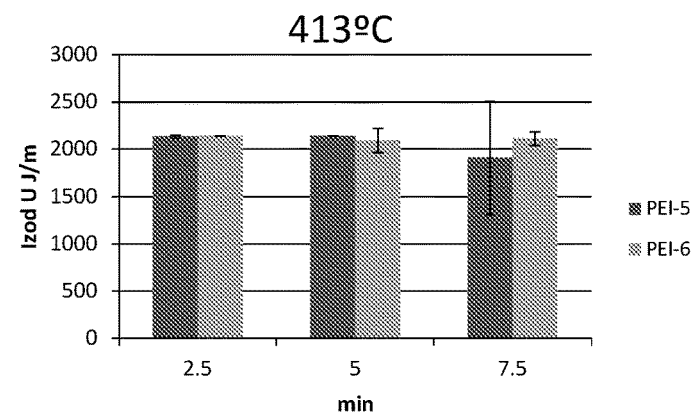
Figure 10A:
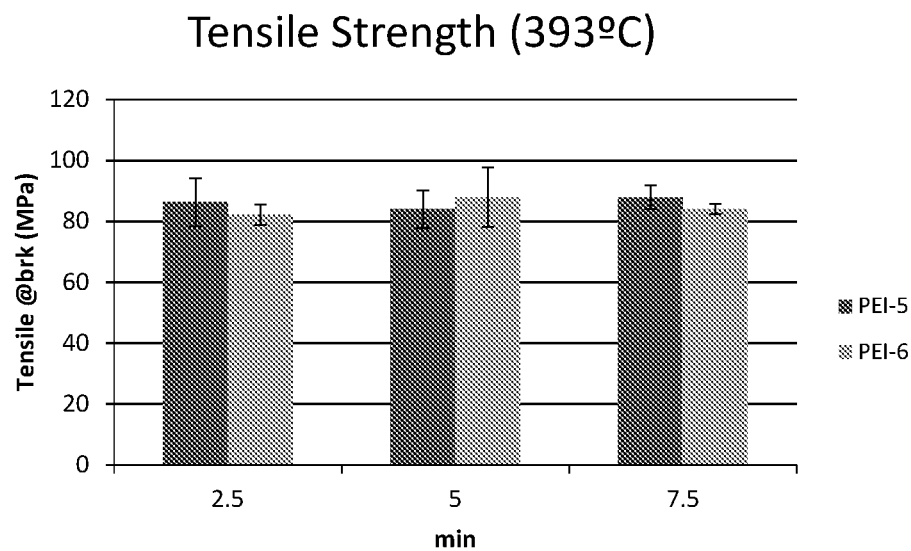
FIGS. 10a, 10b, and 10c show graphs showing the effect of residence time on the tensile strength at of the resulting PEI-5 and PEI-6 at different residence temperatures.
Figure 10B:
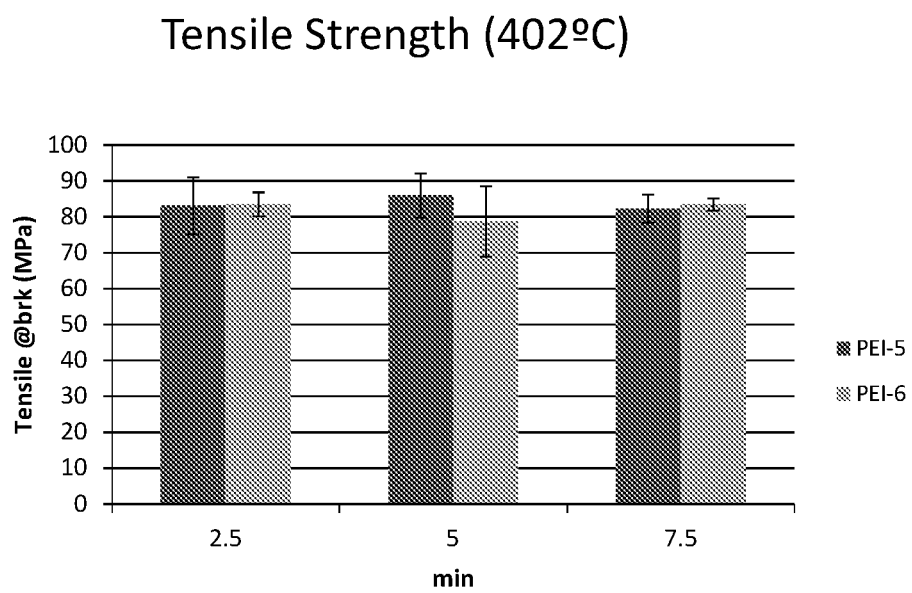
Figure 10C:
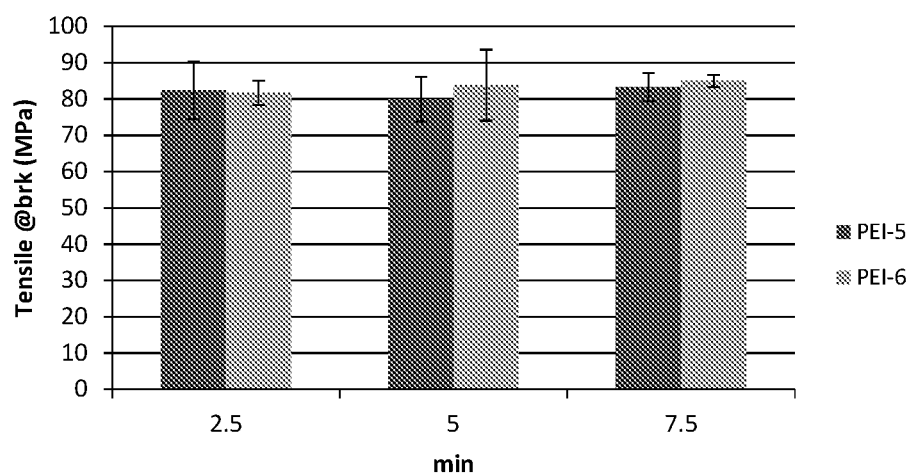

However, these differences did not affect the unnotched Izod impact properties (FIG. 9) or the tensile strength retention of the injection molded (high temperature) parts (FIG. 10). In other words, the change in the catalyst did not significantly change the processability or the physical performance of the 4,4'-isomer polymers.

Example 4

Metal loss in the presence of the polymers was determined by long-term melt treatment of metal coupons. The tests were conducted to compare the corrosion rate of the non-SPP (PEI-1) and the SPP (PEI-2) polymers of Example 1. The metal coupons used were 316L, CPM 590V, Lescowear, and LC200N. The metal loss was measured after 200 hours of melt treatment. Screw elemental alloys were machined down to ½-inch×2-inch×⅛-inch thick coupon size and polished to an SPI B3 finish (on the ½-inch×2-inch sides only). The data gathered are reported on Table 6.

The melt treatment was conducted over an 8 day period and the coupon weight was measured before and after the testing. The corrosion rate was calculated and is listed in Table 6. The corrosion rate from metal loss rate in mm/y can be calculated using the formula $$534 \times 1000(W/DAT),$$

where:
   $W$=weight loss in grams;
   $D$=metal density in g/cm$^3$;
   $A$=area of sample in in$^2$; and
   $T$=time of exposure of the metal sample in hours.

The result in mm/y (millimeter/year) can be converted to mpy (mil/year) (1 mpy=0.0254 mm/y)

TABLE 6

| | | Materials | | | | | | |
|---|---|---|---|---|---|---|---|---|
| | | 316L[1] | LC200N[2] | LESCO WEAR[3] | CPM S90V[4] | 316L[1] | LC200N[2] | LESCO WEAR[3] | CPM S90V[4] |
| | | Non-SPP (PEI-1) | | | | SPP (PEI-2) | | | |
| Time | Hrs. | 192 | 192 | 192 | 192 | 168 | 168 | 168 | 168 |
| Density | g/cm³ | 7.67 | 7.53 | 7.77 | 7.78 | 7.67 | 7.53 | 7.77 | 7.78 |
| Length | inch | 1.997 | 2.0025 | 2.006 | 1.997 | 2.0185 | 1.997 | 2.0185 | 1.997 |
| Width | inch | 0.7655 | 0.4885 | 0.504 | 0.5075 | 0.7655 | 0.4885 | 0.504 | 0.5075 |
| Thick | inch | 0.114 | 0.121 | 0.123 | 0.1195 | 0.114 | 0.121 | 0.123 | 0.1195 |
| Area Surface inch² | | 3.638 | 2.551 | 2.635 | 2.634 | 3.638 | 2.551 | 2.635 | 2.634 |
| Initial Weight | grams | 20.1542 | 14.1634 | 15.0459 | 14.1336 | 19.977 | 14.145 | 15.041 | 14.12 |
| After Weight | grams | 20.1645 | 14.1582 | 15.0345 | 14.1327 | 19.9723 | 14.1375 | 15.0174 | 14.1045 |
| Change Weight | grams | −0.0103 | 0.0052 | 0.0114 | 0.0009 | 0.0047 | 0.0075 | 0.0236 | 0.0155 |
| Corrosion Rate (mpy) | | −1.03 | 0.75 | 1.55 | 0.12 | 0.54 | 1.24 | 3.66 | 2.4 |
| Avg. Mass change (mpy) | | −1.03 | 0.75 | 1.55 | 0.12 | 0.54 | 1.24 | 3.66 | 2.4 |

[1]316L stainless steel provides a good comparison with other alloys.
[2]LC200N is a high nitrogen alloyed tool steel which exhibits superior corrosion resistance combined with high toughness even at hardness up to 60HRC. Combining pressurized eletroslag remelting with a smart forging technology, and amazing increase in cleanliness and structure, which means a very fine and homogenous microstructure can be achieved.
[3]Lescowear cold work tool steel is a versatile medium-chromium, air-hardening tool steel characterized by a very good combination of toughness and wear resistance, available primarily in round bar forms for cold work tooling applications that demand better toughness. Typical applications for Lescowear cold work tool steel include punches, blanking dies, thread roll dies, coining dies, drawing dies, upsetting dies, and rolls.
[4]CPM S90V is a tool steel made by the Crucible Particle Metallurgy process. It is a martensitic stainless steel with a high volume of vanadium carbides for exceptionally good wear resistance. Its high vanadium content favors the formation of hard vanadium carbides instead of chromium carbides for wear resistance, leaving sufficient chromium in the matrix to provide good corrosion resistance.

The data in Table 6 demonstrate a significant reduction in the metal loss rate of the non-SPP polymer (PEI-1) when compared to the SPP polymer (PEI-2). The mass changes of the metal coupons treated with the non-SPP polymer are significantly reduced compared to the non-SPP polymer for 316L, LC200N, LESCOEAR and CPM 590V. Overall the metal weight loss rate with the non-SPP polymer is about half of the SPP polymer on average.

The surface of 316L was not polished. The residual polymer on 316L was more than the other three alloys. As a result, a weight gain was measured on 316L. The metal loss rate measured here for either polymer is not unduly high.

What is claimed is:

1. A method for the manufacture of a polyetherimide composition having improved melt stability, the method consisting of catalyzing imidization of a 3-substituted phthalic anhydride of the formula

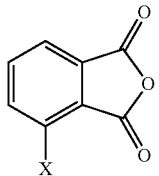

with a sulfone diamine selected from 3,3'-diaminodiphenyl sulfone, 3,4'-diaminodiphenyl sulfone, 4,4'-diaminodiphenyl sulfone, and combinations thereof with a hexa($C_{1-6}$)alkylguanidinium salt catalyst, a α,ω-bis(penta($C_{1-6}$)alkylguanidinium)($C_{1-6}$)alkane salt catalyst or a combination thereof in the presence of a solvent, to provide a bis(phthalimide) composition comprising a residue of the catalyst and a 3,3'-bis(phthalimide) of the formula

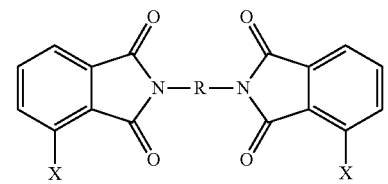

wherein the 3-substituted phthalic anhydride and the sulfone diamine convert to the 3,3'-bis(phthalimide) to at least 99% completion, and
catalyzing polymerization of the 3,3'-bis(phthalimide) and an alkali metal salt of a dihydroxy aromatic compound of the formula

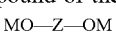
MO—Z—OM in the presence of the catalyst that catalyzes the imidization of the 3-substituted phthalic anhydride and the sulfone diamine to form the polyetherimide composition consisting of
a residue of the catalyst and
a polyetherimide of the formula

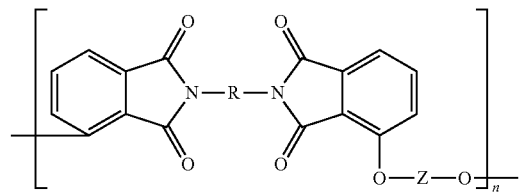

wherein in the foregoing formulae
X is selected from fluoro, chloro, bromo, iodo, and combinations thereof;
R is selected from 3,3'-diphenylene sulfone, 3,4'-diphenylene sulfone, 4,4'-diphenylene sulfone, and combinations thereof;
M is an alkali metal;
Z is an aromatic $C_{6-24}$ monocyclic or polycyclic moiety optionally substituted with 1 to 6 $C_{1-8}$ alkyl groups, 1 to 8 halogen atoms, or combinations thereof; and n is an integer greater than 1;

wherein the polyetherimide has a Tg that is more than 247° C., no detectable amount of sodium aryl phosphinate salt, and, wherein the polyetherimide, in molten form, has a viscosity that is the same viscosity as the initial viscosity or less than the initial viscosity after the polyetherimide is exposed to a temperature that is at least 400° C. for at least 5 minutes, the initial viscosity being the viscosity the polyetherimide has after the polyetherimide has been exposed to at least 400° C. for six minutes.

2. The method of claim 1, wherein the polyetherimide is exposed to a temperature of 770° F. (410° C.).

3. The method of claim 1, wherein the 3-substituted phthalic anhydride and the sulfone diamine converts to the 3,3'-bis(phthalimide) in a conversion of at least 99.5%.

4. The method of claim 1, wherein the polyetherimide has a glass transition temperature, Tg, that is at least 260° C.

5. The method of claim 4, wherein X is chloro, and Z is 2,2-(4-phenylene) isopropylidene.

6. The method of claim 1, wherein the polyetherimide retains a melt stability that is at least 95% when the polyetherimide is exposed to a temperature of 770° F. (410° C.) for 9 minutes.

7. The method of claim 1, wherein the catalyst is present in an amount ranging from 0.05 to 1 mole % based on the moles of the sulfone diamine during the imidization, and a second catalyst is added before the polymerization, wherein the second catalyst is the same catalyst used for the imidization.

8. The method of claim 1, wherein the catalyst is hexaethylguanidinium chloride.

9. The method of claim 1, wherein the 3,3'-bis(phthalimide) composition and the polyetherimide composition are manufactured in the same vessel.

10. The method of claim 1, wherein X is chloro, fluoro, or bromo, and

Z is a divalent group of formula

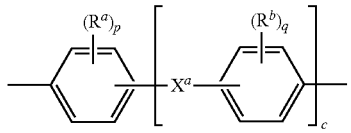

wherein $R^a$ and $R^b$ are each a halogen atom or a monovalent hydrocarbon group and can be the same or different;

$X^a$ is a single bond, —O—, —S—, —S(O)—, —S(O)$_2$—, —C(O)—, or a $C_{1-18}$ organic group;

p and q are each independently integers of 0 to 4; and c is 0 or 1.

11. The method of claim 1, wherein less than 1000 ppm of the residue of the catalyst, based on the weight of the polyetherimide is present in the polyetherimide composition.

12. An article comprising the polyetherimide composition manufactured by the method of claim 1.

13. The article of claim 12, selected from a sheet, film, multilayer sheet, multilayer film, molded part, extruded shape, coated part, molded shape, pellet, powder, foam, fiber, fibrid, flaked fiber, and combinations thereof.

14. The article of claim 12, wherein the article is a molded part.

15. The article of claim 14, wherein the molded part is an injection molded part.

16. The article of claim 12, wherein the article is a sheet or film and further comprises a conductive metal layer disposed on a side thereof.

17. The article of claim 12, wherein the article is an optical lens.

18. The article of claim 12, wherein the article is an optical fiber connector, an electrical connector, an LED reflector, a printed circuit board substrate, or a reflector for automotive headlamp.

19. A polyetherimide composition consisting of (i) a polyetherimide of the formula

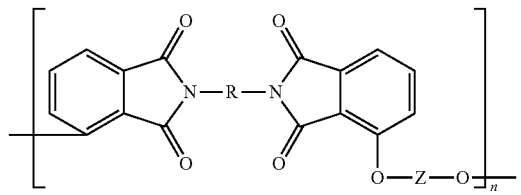

and (ii) a residue of a guanidinium catalyst and optionally, a residue of a catalyst selected from quaternary ammonium salts, quaternary phosphonium salts, pyridinium salts, imidazolium salts, and combinations thereof, wherein the guanidinium catalyst comprises hexa($C_{1-6}$)alkylguanidinium salt catalyst, a α,ω-bis(penta($C_{1-6}$)alkylguanidinium)($C_{1-6}$)alkane salt catalyst or a combination thereof, wherein the guanidinium catalyst residue is present in an amount less than 1000 ppm, based on the weight of the polyetherimide, the polyetherimide being a catalyzed polymerization reaction product of (1) a 3,3'-bis(phthalimide) composition comprising a catalyzed imidization product of a 3-substituted phthalic anhydride and a sulfone diamine selected from 3,3'-diaminodiphenyl sulfone, 3,4'-diaminodiphenyl sulfone, 4,4'-diaminodiphenyl sulfone, and combinations thereof, and (2) an alkali metal salt of a dihydroxy aromatic compound, the imidization product being catalyzed by the guanidinium catalyst;

wherein the substituted 3-phthalic anhydride has a formula

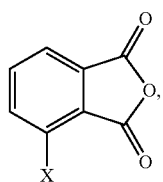

the sulfone diamine has a formula

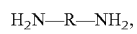

the 3,3'-bis(phthalimide) has a formula

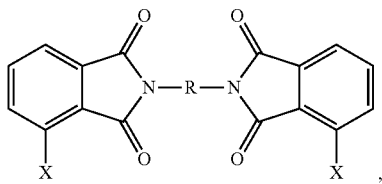

and
the alkali metal salt of the dihydroxy aromatic compound has a formula

MO—Z—OM, wherein in the foregoing formulae,
X is selected from fluoro, chloro, bromo, iodo, and combinations thereof;
R is selected from 3,3'-diphenylene sulfone, 3,4'-diphenylene sulfone, 4,4'-diphenylene sulfone, and combinations thereof;
M is an alkali metal;
Z is an aromatic $C_{6-24}$ monocyclic or polycyclic moiety optionally substituted with 1 to 6 $C_{1-8}$ alkyl groups, 1 to 8 halogen atoms, or combinations thereof; and
n is an integer greater than 1;
wherein the polyetherimide has a Tg that is more than 247° C., no detectable amount of sodium aryl phosphinate salt, and,
wherein the polyetherimide, in molten form, has a viscosity that is the same viscosity as the initial viscosity or less than the initial viscosity after the polyetherimide is exposed to a temperature that is at least 400° C. for at least 5 minutes, the initial viscosity being the viscosity the polyetherimide has after the polyetherimide has been exposed to at least 400° C. for six minutes.

20. The polyetherimide composition of claim 19, wherein the polymerization is catalyzed by the same catalyst that catalyzes the imidization.

21. The polyetherimide composition of claim 19, wherein the imidization catalyst is hexaethylguanidinium chloride.

22. The polyetherimide composition of claim 19, wherein X is chloro, fluoro, or bromo, and
Z is a divalent group of formula

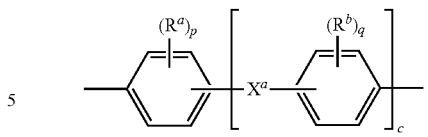

wherein
$R^a$ and $R^b$ are each a halogen atom or a monovalent hydrocarbon group and can be the same or different;
$X^a$ is a single bond, —O—, —S—, —S(O)—, —S(O)$_2$—, —C(O)—, or a $C_{1-18}$ organic group;
p and q are each independently integers of 0 to 4; and
c is 0 or 1.

23. The polyetherimide composition of claim 22, wherein X is chloro, and
Z is 2,2-(4-phenylene)isopropylidene.

24. An article comprising the polyetherimide composition of claim 19.

25. The article of claim 24, selected from a sheet, film, multilayer sheet, multilayer film, molded part, extruded shape, molded shape, coated part, pellet, powder, foam, fiber, fibrid, flaked fiber, and combinations thereof.

26. The article of claim 25, wherein the article is a sheet or film and further comprises a conductive metal layer disposed on a side thereof.

27. The article of claim 24, wherein the article is selected from an extruded sheet, extruded film, extruded fiber, and extruded stockshape.

28. The article of claim 24, wherein the article is a molded part.

29. The article of claim 28, wherein the molded part is an injection molded part.

30. The article of claim 24, wherein the article is an optical lens.

31. The article of claim 24, wherein the article is an optical fiber connector, an electrical connector, an LED reflector, a printed circuit board substrate, or a reflector for automotive headlamp.

32. A method of forming an article, comprising shaping, extruding, blow molding, or injection molding the polyetherimide composition of claim 19 to form the article.

* * * * *